US011925967B2

(12) United States Patent
Thomas

(10) Patent No.: US 11,925,967 B2
(45) Date of Patent: Mar. 12, 2024

(54) TOOL KIT WITH QUICK-CONNECT COUPLING FOR PAINTLESS DENT REMOVAL

(71) Applicant: Jake Matthew Thomas, Grapevine, TX (US)

(72) Inventor: Jake Matthew Thomas, Grapevine, TX (US)

( * ) Notice: Subject to any disclaimer, the term of this patent is extended or adjusted under 35 U.S.C. 154(b) by 0 days.

(21) Appl. No.: 18/086,625

(22) Filed: Dec. 21, 2022

(65) Prior Publication Data

US 2023/0149997 A1 May 18, 2023

Related U.S. Application Data

(63) Continuation-in-part of application No. 17/736,241, filed on May 4, 2022, now Pat. No. 11,826,807, (Continued)

(51) Int. Cl.
*B21D 1/06* (2006.01)
*B21D 1/12* (2006.01)
(Continued)

(52) U.S. Cl.
CPC .................. *B21D 1/06* (2013.01); *B21D 1/12* (2013.01); *B25B 13/463* (2013.01); *B25B 23/0035* (2013.01); *B25B 23/0057* (2013.01)

(58) Field of Classification Search
CPC ... B25B 13/463; B25B 23/0035; B25B 13/44; B21D 1/06; B21D 1/12
See application file for complete search history.

(56) References Cited

U.S. PATENT DOCUMENTS 5,619,876 A * 4/1997 Choi ........................ B21D 1/06 72/705
6,325,393 B1 * 12/2001 Chen ................... B25B 23/0057 279/22

(Continued)

FOREIGN PATENT DOCUMENTS

DE 102004028568 1/2006
DE 202013104245 U1 * 1/2014 ........... B25B 13/463

OTHER PUBLICATIONS

DE-202013104245-U1 Translation (Year: 2014).*

*Primary Examiner* — Michael W Hotchkiss
(74) *Attorney, Agent, or Firm* — Boris Leschinsky

(57) ABSTRACT

A paintless dent repair kit includes a housing with a handle extending therefrom and a toothed wheel rotatably retained in the housing. The toothed wheel has a plurality of teeth extending outwards therefrom and is configured to receive, replace, and removably retain a connector, which is attached on the other end to a quick-connect coupling. The quick-connect coupling is, in turn, configured to releasably retain a socket of a commercially-available set of dent removal tips, for example, a KIPP socket or an ULTRA socket. The housing features a first button connected to a teethed lever slidably positioned to be either engaged or disengaged with the plurality of teeth of the toothed wheel depending on the position of the first button. Unless the first button is depressed, the dent removal tool is configured to securely and fixedly retain the dent removal tip to facilitate direct transmission of force and torque from the handle to the coupling and then to the dent removal tip during dent removal operations.

7 Claims, 18 Drawing Sheets

Related U.S. Application Data which is a continuation-in-part of application No. 17/526,261, filed on Nov. 15, 2021, now abandoned.

(60) Provisional application No. 63/266,085, filed on Dec. 28, 2021, provisional application No. 63/291,471, filed on Dec. 20, 2021.

(51) Int. Cl.
*B25B 13/46* (2006.01)
*B25B 23/00* (2006.01)

(56) References Cited

U.S. PATENT DOCUMENTS 6,647,831 B2 * 11/2003 Hu ........ B25B 23/0035 81/185
6,722,179 B1 * 4/2004 Ventura ........ B21D 1/06 72/705
6,766,716 B1 * 7/2004 Lee ........ B25B 15/001 81/177.85
6,789,449 B2 * 9/2004 Liu ........ B25B 13/463 81/58
7,131,358 B2 * 11/2006 Hsien ........ B25B 23/0035 81/125
7,261,021 B1 * 8/2007 Carnesi ........ B25B 13/44 279/71
7,765,897 B2 * 8/2010 Kim ........ B25B 13/14 81/177.85
7,913,592 B2 * 3/2011 Hu ........ B25B 23/12 81/177.85
7,954,824 B2 * 6/2011 Hu ........ B25B 23/12 279/22
8,424,421 B1 * 4/2013 Woo ........ B25B 23/0035 81/63
8,555,751 B1 * 10/2013 Chern ........ B25G 1/00 81/177.85
9,248,556 B1 * 2/2016 Chen ........ B25B 13/463
9,308,631 B2 * 4/2016 Shyu ........ B25B 23/0035
9,868,143 B2 * 1/2018 Zimmerman ........ B21D 1/06
9,999,912 B2 * 6/2018 Schaechinger ..... B23B 31/1071
10,252,308 B2 * 4/2019 Hummert ........ B21D 1/06
10,744,623 B2 * 8/2020 Yang ........ H04W 36/0016
10,773,363 B2 * 9/2020 Liao ........ B25B 23/0007
11,247,254 B2 * 2/2022 Hopf ........ B21D 1/06
11,833,563 B2 * 12/2023 Hopf ........ B21D 1/06
2002/0066301 A1 * 6/2002 Cmelik ........ B21D 1/06 72/477
2003/0178794 A1 * 9/2003 Chen ........ B25B 23/0057 279/22
2005/0252271 A1 * 11/2005 Fredenberg ........ B21D 1/06 72/457
2006/0107802 A1 * 5/2006 Hsien ........ B25B 23/0057 81/124.1
2009/0056407 A1 * 3/2009 Greene ........ B25D 3/00 72/481.1
2010/0000379 A1 * 1/2010 Hsu Chang ........ B25B 13/44 279/66
2010/0229693 A1 * 9/2010 Chen ........ B25G 3/22 81/438
2011/0023666 A1 * 2/2011 Hsu ........ B25B 23/1427 81/438
2012/0326399 A1 * 12/2012 Lin ........ B25B 23/0057 279/75
2014/0047955 A1 * 2/2014 Ou ........ B25B 13/463 81/60
2017/0120316 A1 * 5/2017 Hummert ........ B21D 1/06
2017/0333966 A1 11/2017 Schaechinger
2019/0232467 A1 * 8/2019 Su ........ B25B 13/06
2019/0344406 A1 * 11/2019 Chen ........ B25B 13/463
2020/0269301 A1 8/2020 Hopf
2021/0060633 A1 * 3/2021 White ........ B21D 1/06
2021/0220889 A1 * 7/2021 White ........ B21D 1/12
2021/0220890 A1 * 7/2021 White ........ B21D 1/08

* cited by examiner

TOOL KIT WITH QUICK-CONNECT COUPLING FOR PAINTLESS DENT REMOVAL

CROSS-REFERENCE DATA

This application is a continuation-in part of my U.S. patent application Ser. No. 17/736,241 filed 4 May 2022 entitled “A handle and a kit of tools for paintless dent removal”, which in turn claims a priority date benefit from my US Provisional Patent Application No. 63/266,085 filed on 28 Dec. 2021 and entitled “Push-Button-D-Ratchet D-Connect System”. The ’241 application also claims a priority benefit of my U.S. Provisional Patent Application No. 63/291,471 filed on 20 Dec. 2021 entitled “D-Ratchet and D-Connect tool system”. Finally, the ’241 application is a continuation-in-part of my U.S. patent application Ser. No. 17/526,261 filed on 15 Nov. 2021 and entitled “RATCHETING TOOL FOR PAINTLESS DENT REMOVAL TOOLS AND METHOD OF USE”. All of the above-mentioned patent documents are incorporated herein by reference in their respective entireties.

BACKGROUND

Without limiting the scope of the invention, its background is described in connection with tools and kits for paintless dent removal. More particularly, the invention describes a universal handle configured for attachment to a variety of tools with an option of rapid exchange of the tools when necessary. A kit containing the universal handle and a series of attachments suitable for paintless dent removal is also described.

Paintless dent removal tools are well known in the art and are effective means for removing dents from the body of a vehicle. Common paintless dent removal tools include rods of various shapes and lengths, wire tools, hook tools, hand tools, hammers, and whale tails. Although effective in most applications, conventional paintless dent removal tools have limitations. For example, a conventional tool is typically made with a manual handle which limits its use in certain working positions. One solution to increase a tool’s versatility has been to remove the manual handle from a conventional paintless dent removal tool and place a ratcheting handle in its place. This, however, forces a user to constantly adjust and reposition the tool, thereby increasing user fatigue and discomfort.

The need exists therefore for a universal dent removal tool and a set of dent removal tips that can be easily attached and removed from the handle of the tool so as to expedite the speed of the dent removal process and reduce the physical efforts needed to perform such repair.

SUMMARY

Accordingly, it is an object of the present invention to overcome these and other drawbacks of the prior art by providing a novel universal dent removal tool and corresponding attachment tips to facilitate rapid tool exchange during paintless dent removal.

It is another object of the present invention to provide a kit containing a universal dent removal tool with a handle and a variety of dent removal tips that can be removably attached to the handle in rapid succession.

It is a further object of the present invention to provide a novel dent removal tool allowing simple repositioning of the handle during the process of manipulating the dent removal tip in order to remove a dent without disturbing the existing paint layer.

It is yet another object of the invention to provide a kit for paintless dent removal having quick-connect couplings to make use of a plurality of other commercially available dent removal tools.

The novel dent removal tool features a tool head assembly with a handle extending therefrom in both directions. The tool head assembly includes a housing containing a toothed wheel and allowing the wheel to rotate inside the housing. The toothed wheel has an outer rim and a plurality of teeth extending outwards therefrom. The inner rim of the toothed wheel is configured to receive, replace, and removably retain any one of a plurality of sockets provided with the tool as a kit.

Each of the plurality of sockets may be attached to one of a corresponding plurality of dent removal tips, which come in various shapes necessary to achieve a complete repair of the dent.

A spring-loaded teethed lever is provided in the housing and is configured to be movable between a first released position and a second depressed position by pushing onto or releasing a first button attached thereto. When the teethed lever is in the first “released” position, the teethed lever is normally engaged with the plurality of teeth of the toothed wheel, thereby preventing the wheel from rotation in any direction.

Depressing the first button moves the teethed lever into a second “depressed” position, which disengages thereof from the plurality of teeth of the toothed wheel and allows the wheel to rotate in either direction. This makes it possible to freely rotate and adjust the position of the handle in relation to the dent removal tip.

Releasing the first button returns the teethed lever to be engaged with the toothed wheel once again—restoring the secure and fixed relationship between the handle and the tip of the dent removal tool such that the repair process may be resumed.

The present invention further features one or more quick-connect couplings to make use of commercially available dent removal tools, thereby making it convenient for owners of these tools to use them with the handle of the present invention.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings, in which:

DETAILED DESCRIPTION OF PREFERRED EMBODIMENTS OF THE INVENTION

Figure 1:
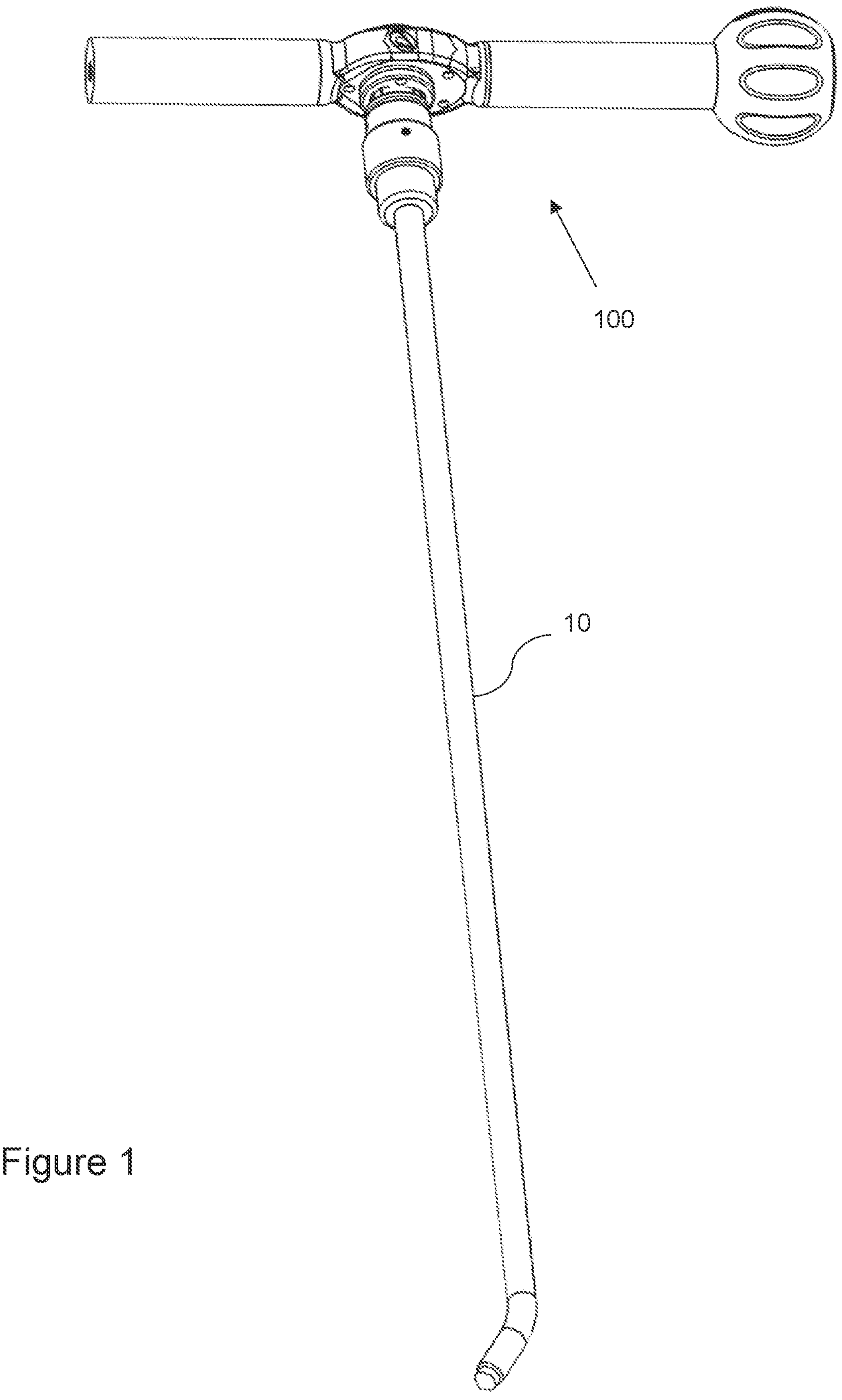
FIG. 1 is a perspective view of the first embodiment of the novel tool assembly.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Various types of dent repair tools have been used in automobile body repair for removing dents from body panels. Some of these devices require that holes be drilled in the body panel in order to attach the dent puller to the damaged area of the panel. Other devices are designed to remove small dents without causing further damage to the body panel. Use of these latter devices generally does not require repainting of the panel, and is thus referred to as "paintless" dent repair.

FIG. 1 shows a general view of the first embodiment of the new device 100 for paintless dent repair. It has a handle and tool head assembly 100 attached to a dent removal tip 10 in a form of a letter "T". A kit containing a variety of tips 10 may be provided along with the handle and tool head assembly 100 so as to provide different tip options for the user. As known by those skilled in the art, a user may use various tips during a single project of removing a dent from a side panel of an automobile or another object. Such tools may include straight tips, bent tips, suction heads, rounded tips, and other tips. In addition to a variety of interchangeable tips, a kit may include suction tools, glue sticks, pulling tabs, hammers, chains, and other instruments and supplies as the invention is not limited in this regard. During a typical dent repair, a user may switch between several dent repair tips and manipulate the handle to cause the tip of the tool to apply desired stress to the repair area to cause the dent to slowly be removed as a result of these manipulations.

Some of the maneuvers with the handle require the handle to be fixed in relationship to the tip 10 so that turning and tilting the handle causes the tip 10 to impart a desired effect on the repair area. Access to the repair area may be limited in some circumstances and tool repositioning is frequently needed. To reposition the tool or just to turn and reposition the handle without shifting the position of the tip itself, the user needs a convenient way to allow rotation of the handle around the longitudinal axis of the tip 10. Rapid engagement and disengagement of the handle assembly 100 and the tip 10 as well as rapid exchange of one tip to another is advantageous in expediting the work of the user in removing the dent.

A typical kit may include several tips 10, all of which may feature a central shaft with a tip extending therefrom, One end of the shaft may have a standard coupler to the handle, such as a KIPP attachment, featured on all tool tips of the kit and allowing the user to utilize the same handle assembly with a variety of tips. Other than KIPP conventions for coupling of the tip to the handle may also be used as the invention is not limited in this regard.

Figure 2:
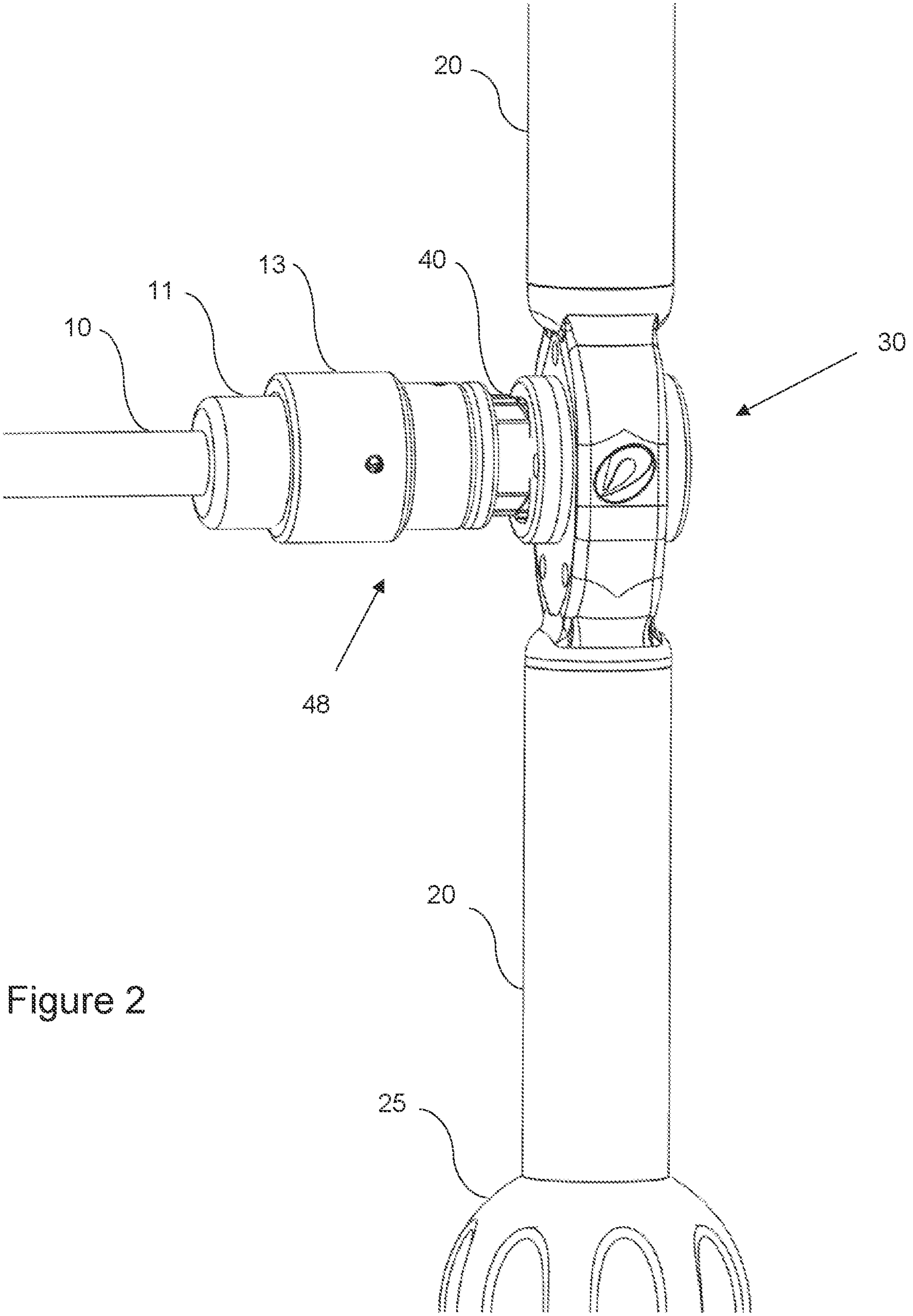
FIG. 2 is a closeup perspective side view of the tip attached to the handle.
Figure 3:
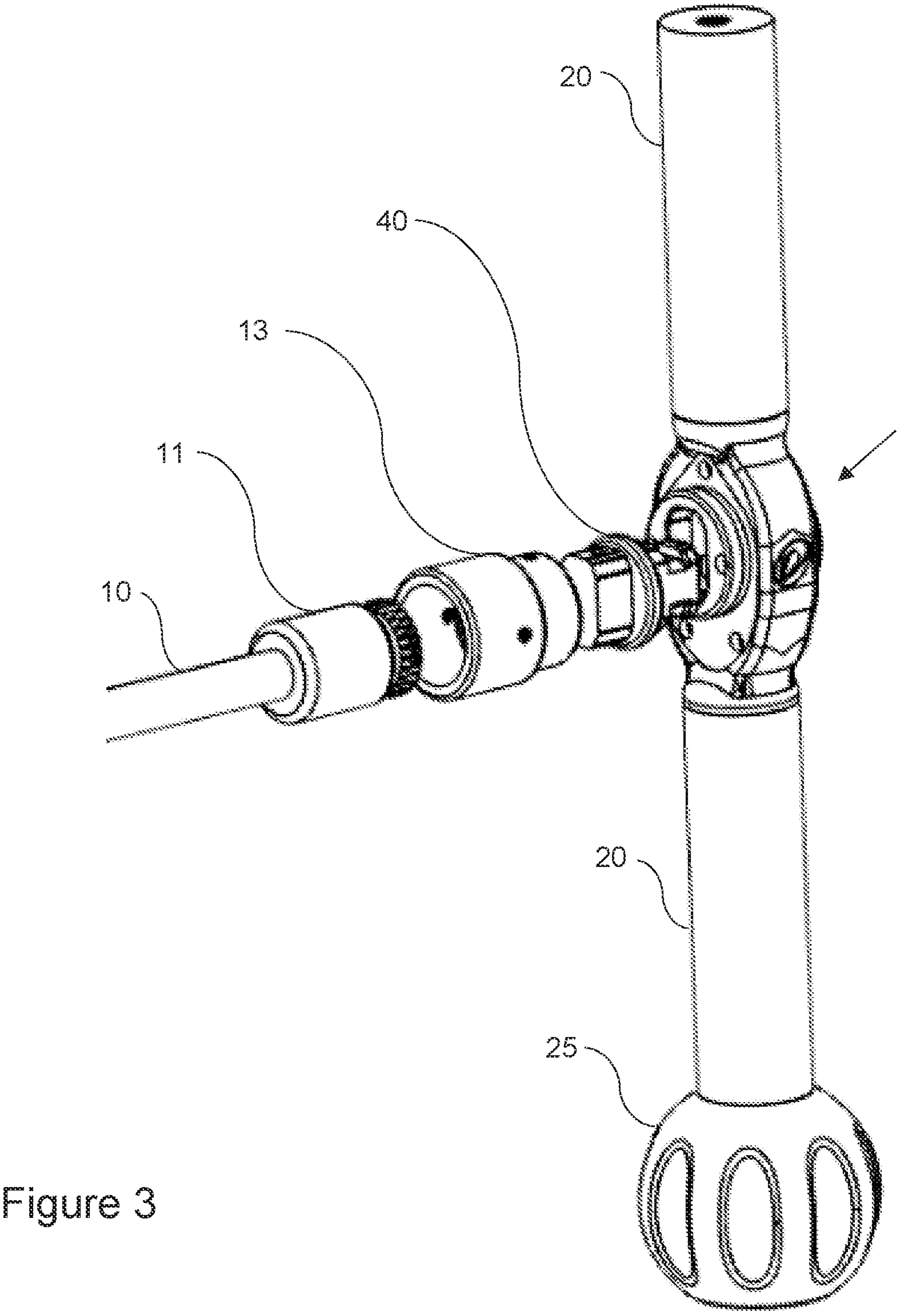
FIG. 3 is a perspective exploded view of the same.
Figure 4:
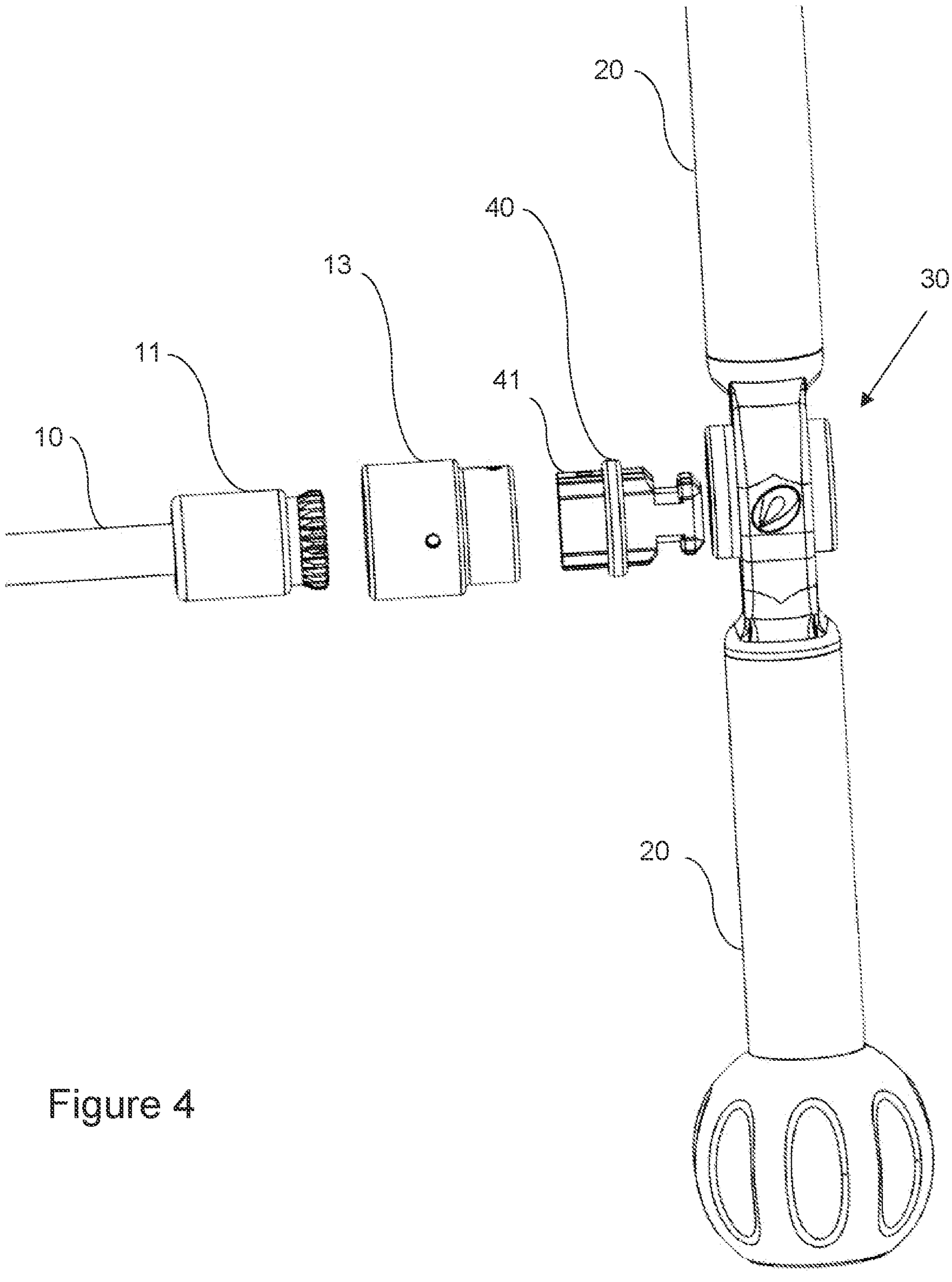
FIG. 4 is an exploded side view of the same.

FIGS. 2-4 show details of the attachment between the tool tip 10 equipped with a KIPP attachment 11 on one end and the tool head assembly 30. A socket assembly 48 comprises a bushing 13 and a connector 40 retained therein. Bushing 13 may be configured to cover the attachment 11 and engage with the gear at the end thereof. The bushing 13 may be secured over the attachment 11 with one or more set screws. The bushing 13 may also be configured to slide over at least a portion of the connector 40 such as a first end 41. Another set screw may be used to secure the bushing 13 to the connector 40 such that the connector 40 may be fixedly attached to the tip 10. All tool tips 10 of the kit may be equipped with their dedicated socket 48 and connector 40 so that the tool kit may be configured to easily replace one tool tip 10 with another as required during the dent removal repair.

The connector 40 may be pushed into the tool head assembly until it engages with thereof. Release of the connector 40 and the corresponding tool tip 10 may be accomplished by pushing on the second button 70 as described in greater detail below.

Figure 5:
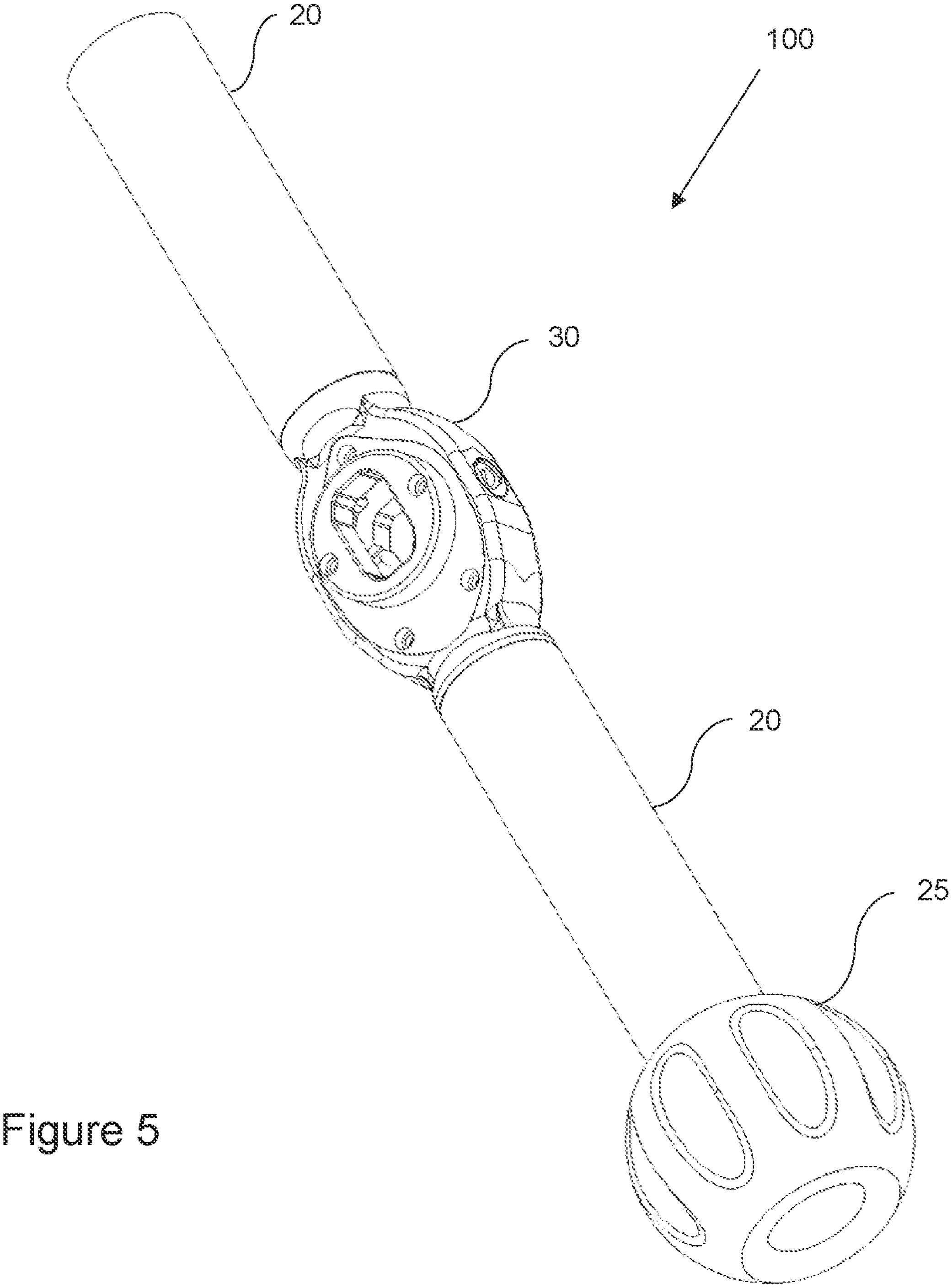
FIG. 5 is a perspective front view of the tool head assembly with a handle extending therefrom.
Figure 6:
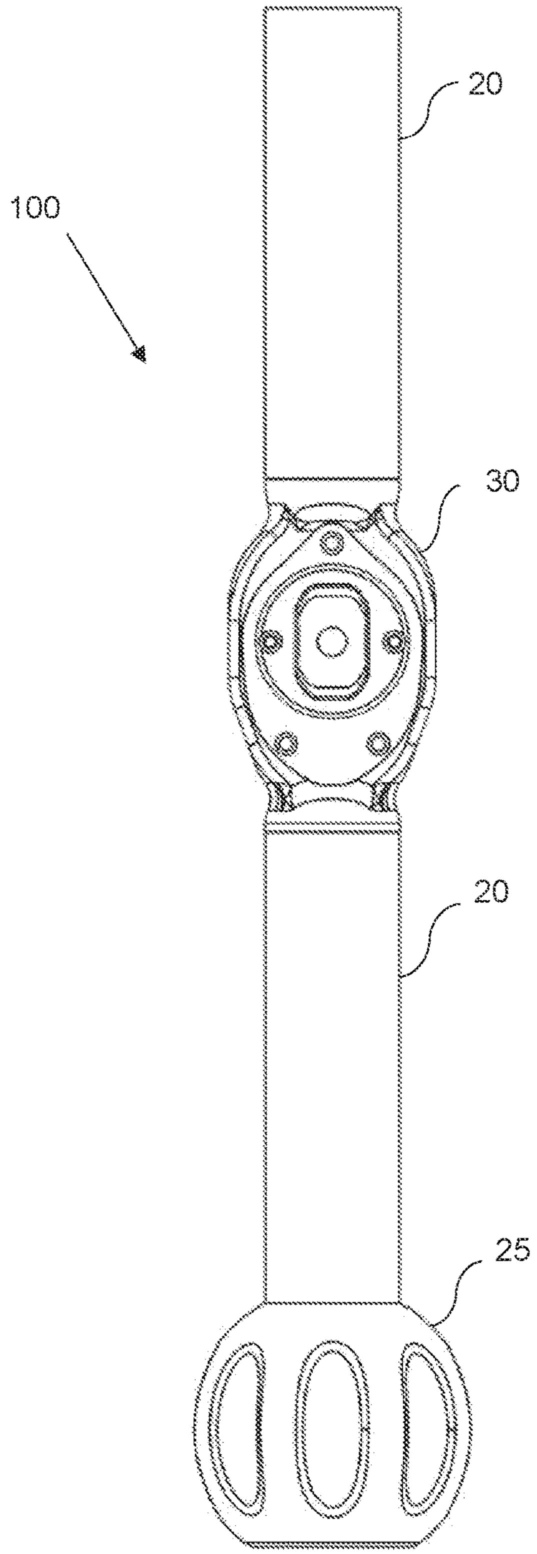
FIG. 6 is a side view of the same.
Figure 7:
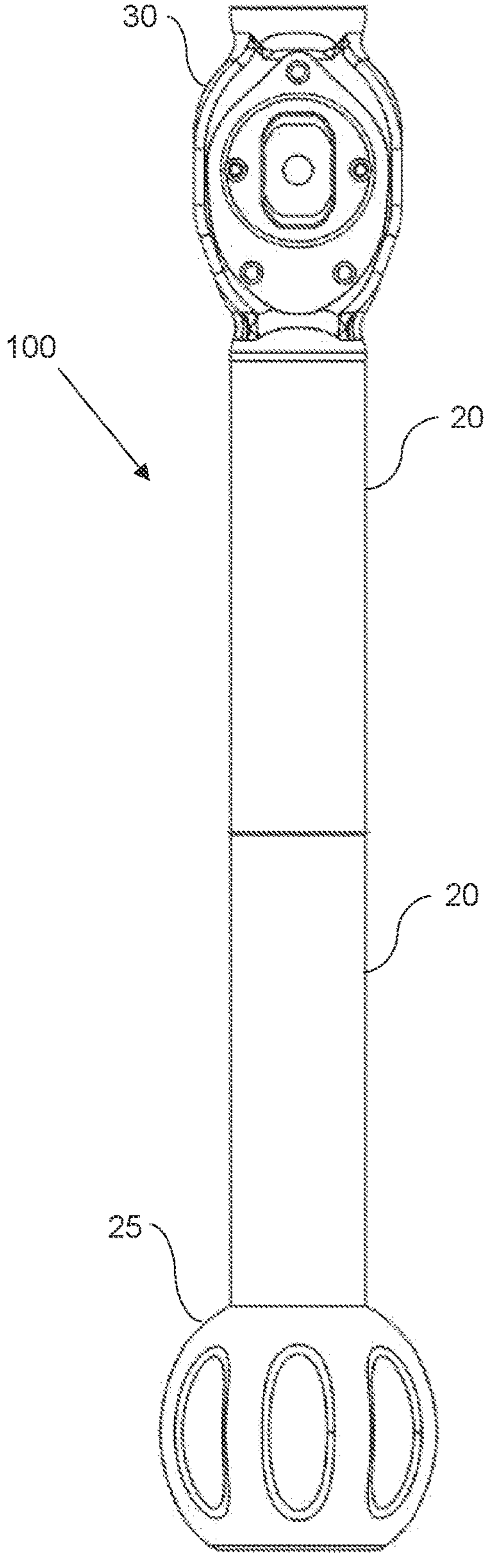
FIG. 7 is a side view of an alternative way to assemble the handle and the tool head.
Figure 23:
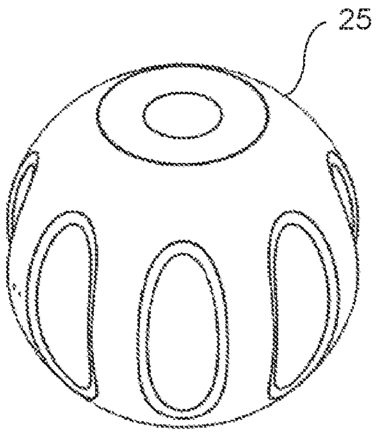
FIG. 23 is a perspective side view of the dank.
Figure 24:
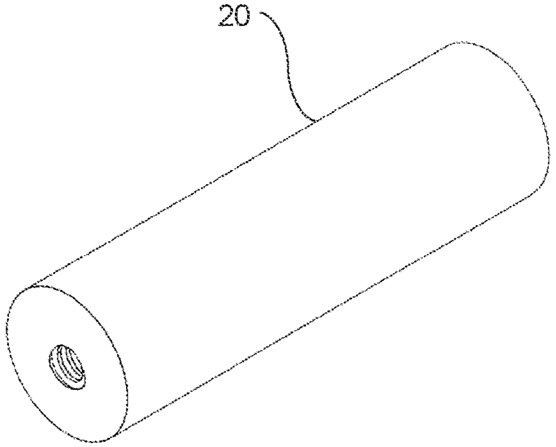
FIG. 24 is a perspective side view of one handle portion.

A broad illustration of the tool head and handle assembly 100 is seen in FIGS. 5, 6, and 7. It includes a tool head assembly 30 and two handle portions 20 extending therefrom with at least one clank 25 provided for convenience and better grip on one of the handle portions 20. A threaded connection between handle portions 20, clank 25, and both ends of the tool head assembly may be provided to allow for a variety of configurations in which the tool of the present invention may be assembled. One alternative arrangement is seen in FIG. 7 showing how two handle portions 20 are assembled together and form a long handle attached to the tool head assembly 30 on one end and to the clank 25 on the other end. Each elongated handle portion 20 may be made with a cylindrical cross-section as seen in FIG. 24 or in any other suitable shape as the invention is not limited in this regard. Details of the clank 25 are seen in FIG. 23. One or more clanks of various shapes and sizes may be provided as part of the kit of tools for the present invention as may be appreciated by those skilled in the art, One or more set screws may be provided to facilitate removable attachment between the handle portions 20, the dank 25, and the tool head assembly 30.

Details of the tool head assembly 30 are now described in greater detail with reference to FIGS. 8-20 showing various views of the assembly as well as FIG. 21-26 showing key individual components thereof. The assembly resides in the cavity of the housing 32, shown in greater detail in FIGS. 21 and 22. All components of the assembly are retained in place with the help of the cover plate 34 configured to rest on a corresponding ledge made in the cavity of the housing 32.

Figure 8:
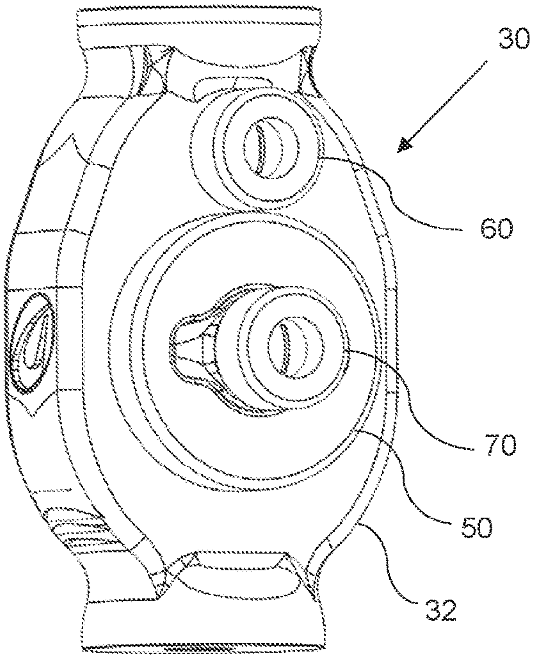
FIG. 8 is a perspective back view of the tool head assembly.

A general side view of the back of the tool head assembly 30 is seen in FIG. 8 and shows a first button 60 and a second button 70, The first button 60 serves to disengage the tool tip 10 from the handle assembly 100 and allow the tool tip 10 to freely rotate about its longitudinal axis. When released, the button 60 causes the tool tip 10 to engage with the handle assembly 100 and remain fixedly attached and connected thereto. The second button 70 serves to release the tool connector 40 from the assembly 100 when depressed, as discussed in greater detail below.

Figure 10:
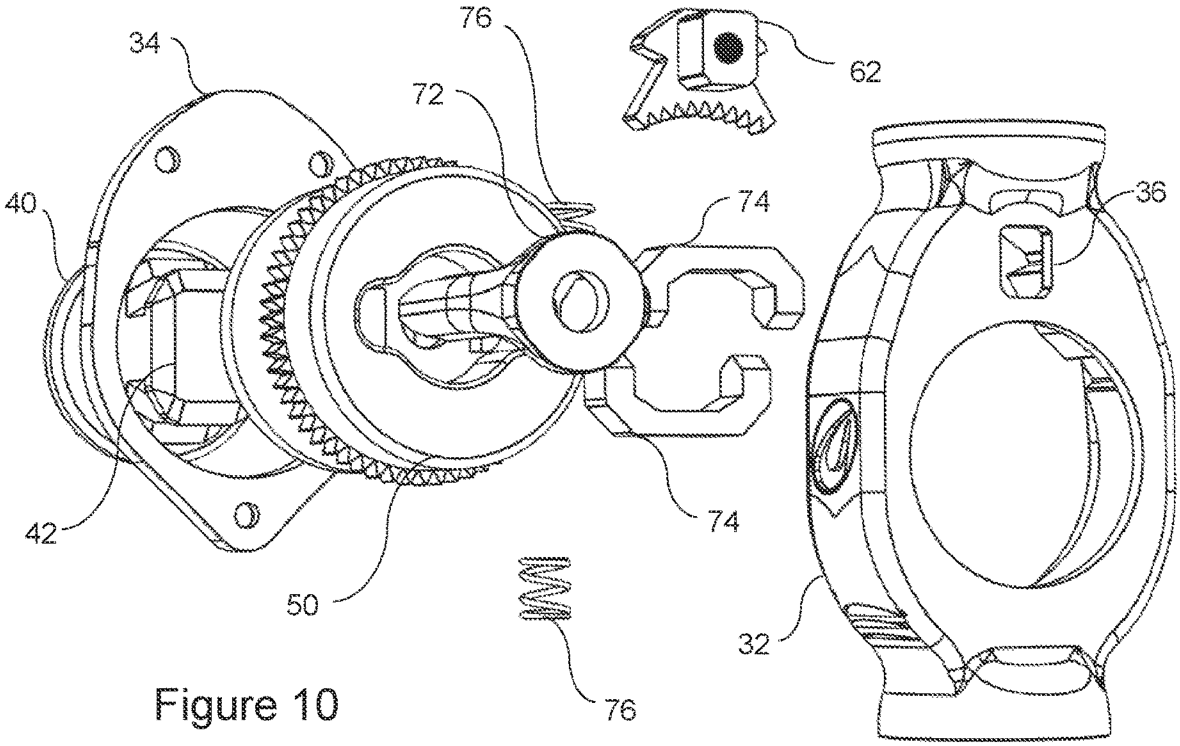
FIG. 10 is a perspective exploded view of the tool head assembly.
Figure 12:
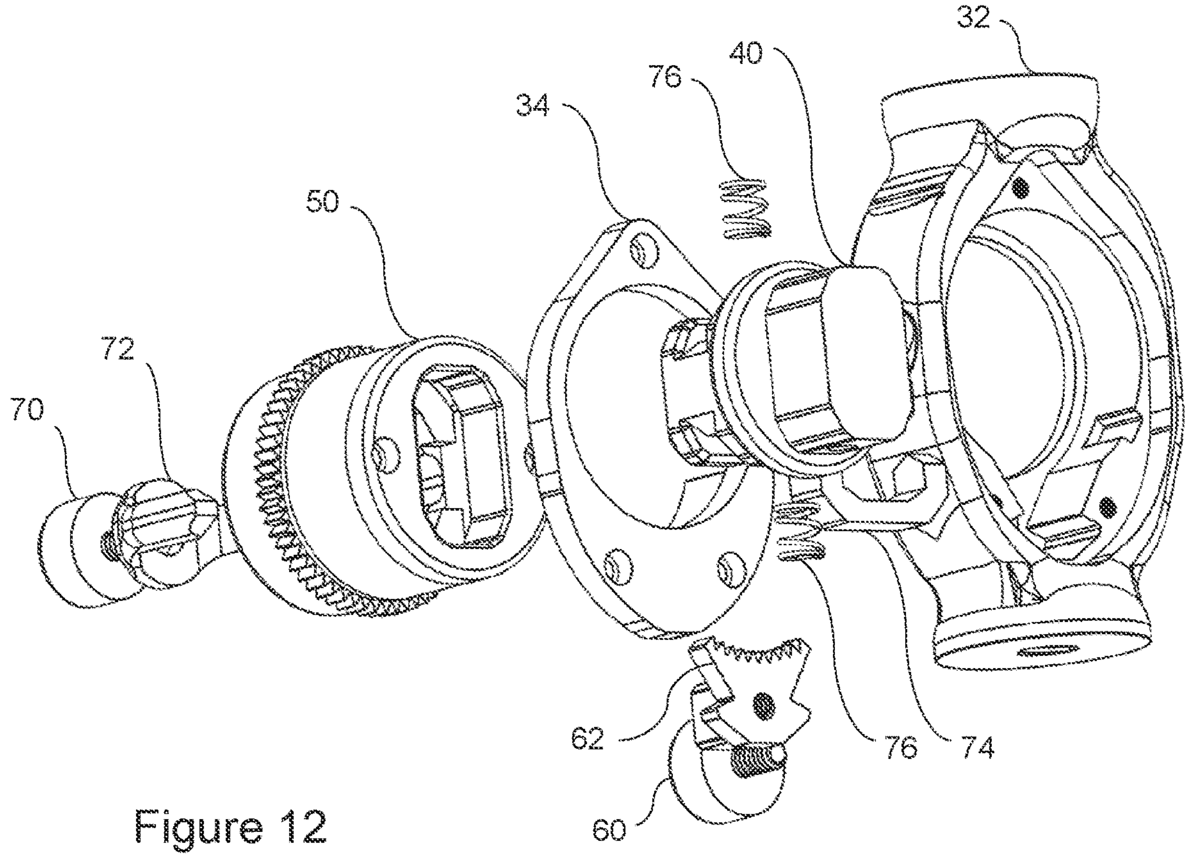
FIG. 12 is another perspective exploded view of the tool head assembly.

One key component of the tool head assembly is a teethed wheel 50, best seen in FIGS. 10 and 12. When positioned inside the cavity of the housing 32 and supported by the cover plate 34 and a side stopper 75 (see FIG. 11*d*), the toothed wheel 50 can rotate freely around its central axis, unless restricted by the engagement of the teethed lever 62. A pair of spring-loaded dips 74 is located inside a void made in the toothed wheel 50 to retain the tapered portion 42 of the connector 40 as described below. A portion of the toothed wheel 50 is seen as protruding from the back of the housing in FIG. 8.

Figure 25:
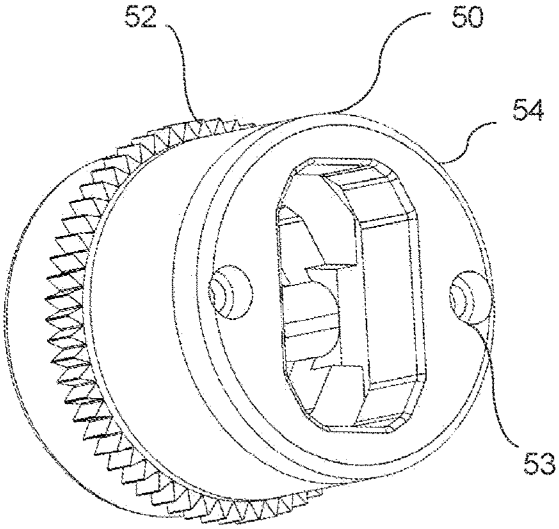
FIG. 25 is a perspective side view of the toothed wheel.
Figure 26:
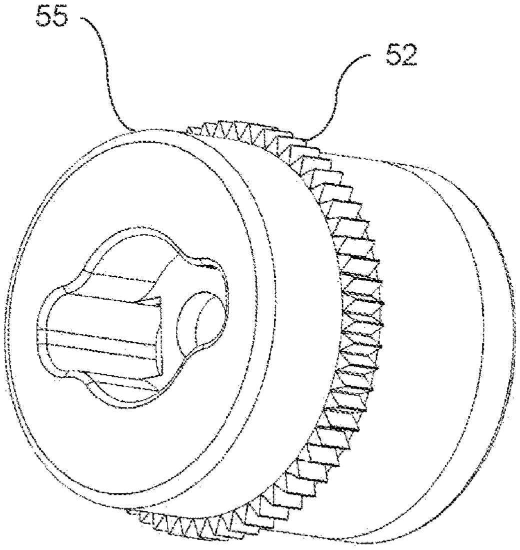
FIG. 26 is an alternative perspective view of the same.
Figure 27:
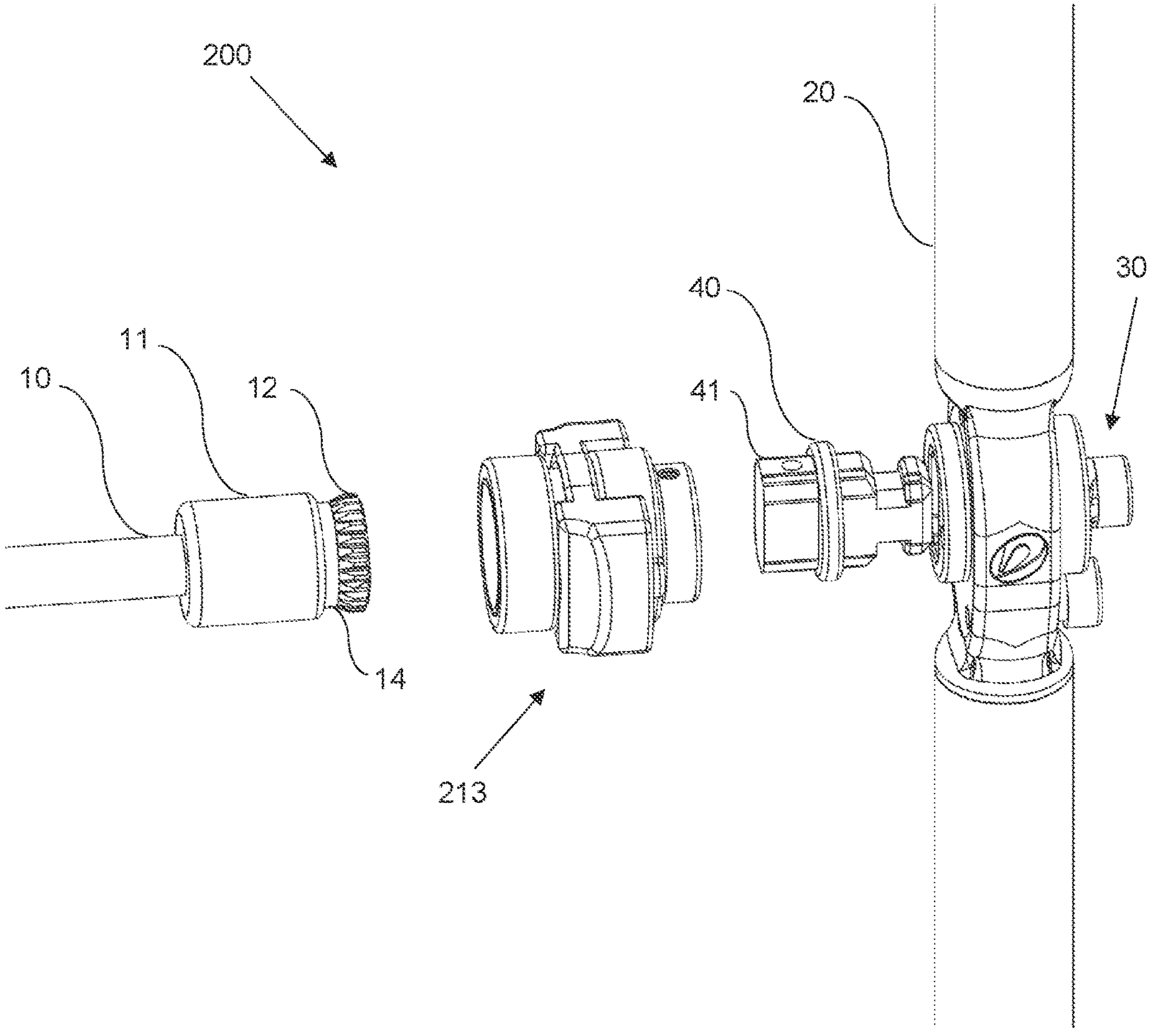
FIG. 27 is a perspective exploded side view of the second embodiment of the present invention showing a quick-connect coupling.

The toothed wheel assembly is seen as an individual component in FIGS. 25 and 26. It includes an outer cylindrical surface with a series of teeth 52. A void inside the wheel 50 is made to retain a pair of dips 74 supported by the corresponding springs 76. The pair of opposite spring-loaded clips 74 facing each other are designed to retain a tapered portion of the connect 40 in between thereof. The void inside the toothed wheel is also configured to allow slidable engagement of the release pin 72. The toothed wheel 50 may be made as a subassembly of three components 52, 54, and 55 fixedly attached to each other with set screws or other retaining members placed in the wells 53.

Figure 9:
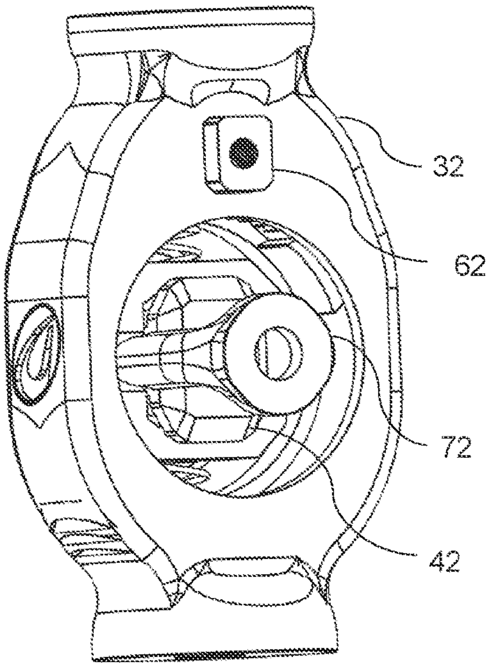
FIG. 9 is the same as in FIG. 8 but with the toothed wheel 50 removed.

The same view of the back of the tool head assembly 30 is seen in FIG. 9 but now with the toothed wheel 50 removed. Also removed are the first and the second buttons 60 and 70. Removal of these components allows seeing the back end of the release pin 72, the protruding top of the teethed lever 62, and the inner workings of the tool head assembly 30.

FIG. 10 shows one exploded view of the internal components of the tool head assembly 30, including a connector 40 facing one end of the toothed wheel 50. The other end of the toothed wheel 50 is seen as accepting a release pin 72 to slide therein. Clips 74 and springs 76 are also seen—these components are located inside the void in the toothed wheel 50. Finally, a teethed lever 62 is seen in FIG. 10. When assembled in the housing 32, this component is protruding through the back wall of the housing via the opening 36 as seen in FIG. 9.

Figure 11A:
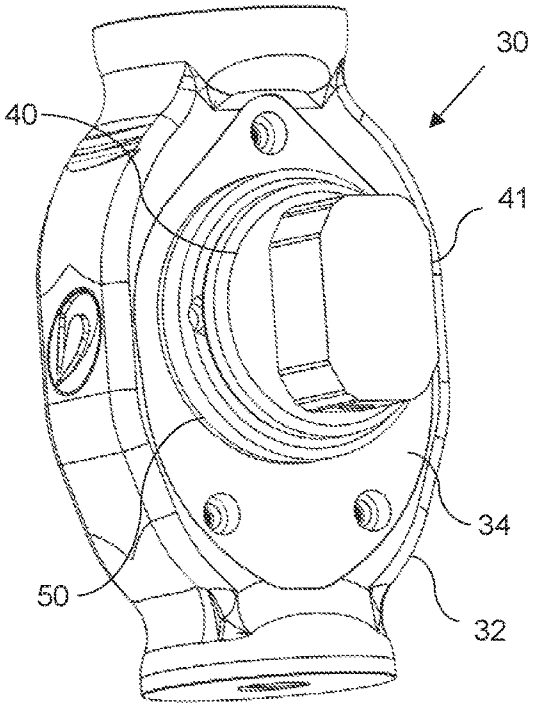
FIG. 11*a* is a perspective front view of the tool head assembly.
Figure 11B:
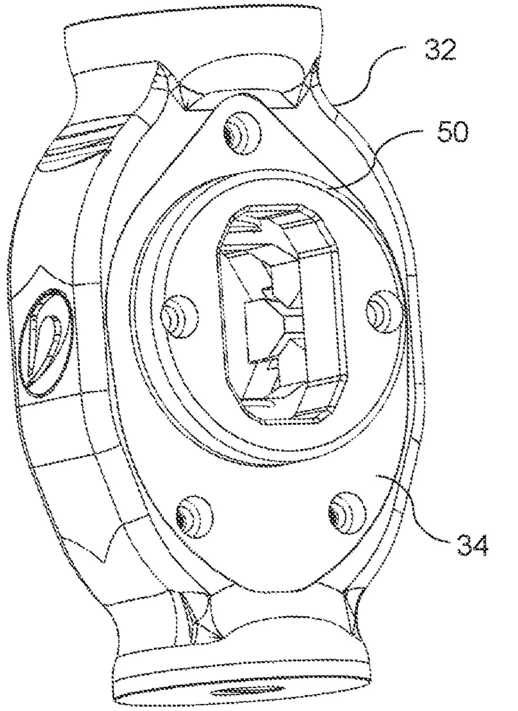
FIG. 11*b* is the same as in FIG. 11*a* but with connector 40 removed.
Figure 11C:
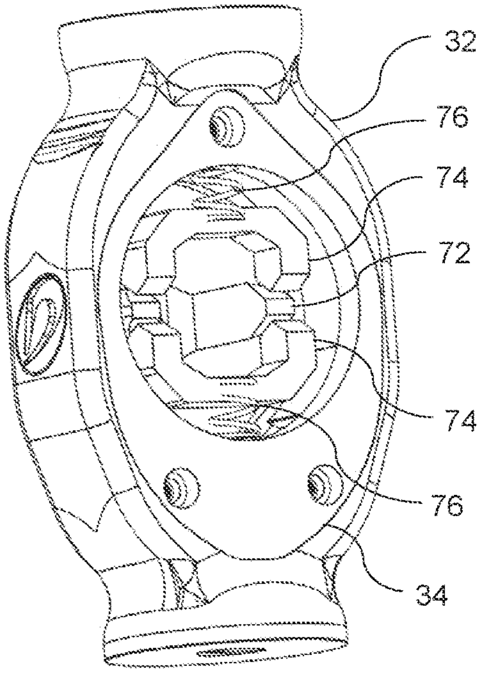
FIG. 11*c* is the same as in FIG. 11*b* but now with the toothed wheel 50 removed.
Figure 11D:
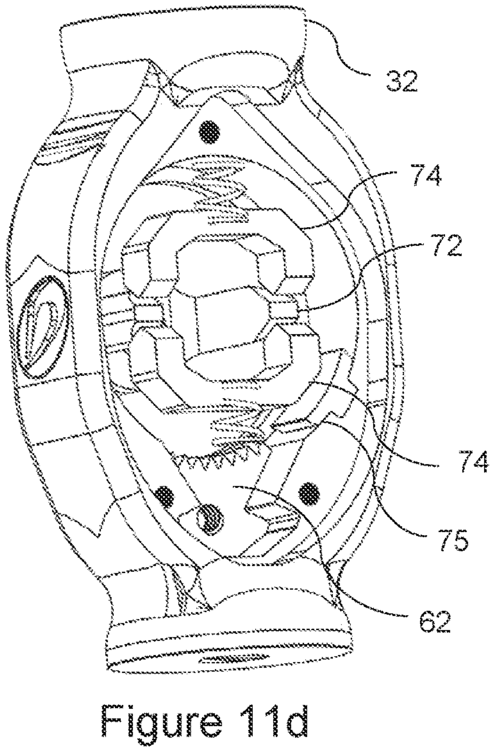
FIG. 11*d* is the same as in FIG. 11*c* but now with the cover plate 34 removed.

FIGS. 11*a* through 11*d* show various stages of disassembly of the tool head 30 as seen from the front. FIG. 11*a* shows an initial view in which the entire tool head is seen with the connector 40 inserted therein. The connector 40 is omitted in the same view in FIG. 11*b* revealing the inside view of the components located in the void of the toothed wheel 50. FIG. 11*c* shows the same but with the toothed wheel 50 removed. Clips 74 and springs 76 are clearly seen in that figure. Removal of the cover plate 34 in FIG. 11*d* reveals the view of the teethed lever 62 and the side stopper 75 needed to retain the toothed wheel 50 in place. Finally, all individual components are once again seen in the exploded view in FIG. 12.

Figure 13:
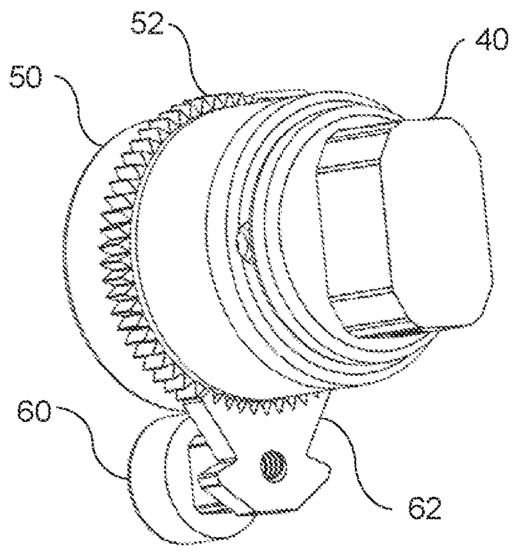
FIG. 13 is a perspective view of the toothed wheel engaged with the teethed lever 62.

FIG. 13 shows the details of the interaction between the toothed portion 52 of the toothed wheel 50 and the teethed lever 62 associated with the first button 60. In a normal position of all these components, the teeth of the teethed lever 62 are engaged with the teeth of the toothed wheel 50 so that the wheel 50 is fixed in place inside the housing 32 and prevented from rotation about its central axis. Pressing on the button 60 causes the teethed lever 62 to slide longitudinally along the wheel 50 and disengage from the teeth 52, thus releasing the wheel 50 to freely rotate in either direction inside the housing 32. Releasing the button 60 causes a spring on the other side of the lever 62 (not shown) to move the teethed lever 62 back into a position of engagement with the toothed wheel 50, therefore precluding it from free rotation and fixing it in place inside the housing 32.

Figure 14:
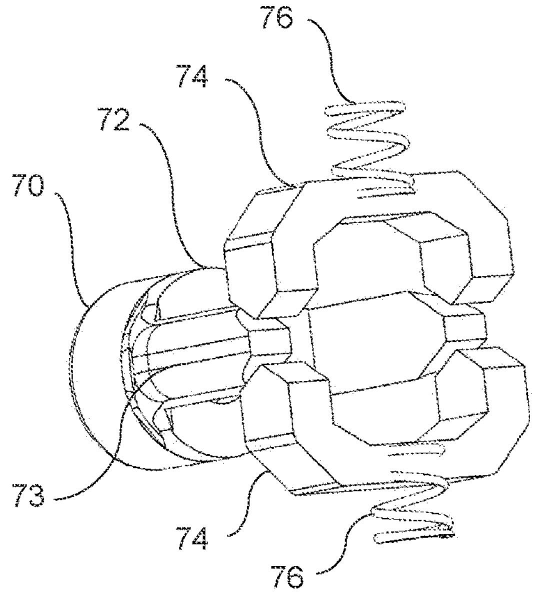
FIG. 14 is a perspective view of the components inside the toothed wheel 50, with the toothed wheel 50 removed.

FIG. 13 further shows the connector 40 engaged with the internal components of the toothed wheel 50, namely with a pair of clips 74 urged to be close to each other by their respective springs 76. FIG. 14 shows these components without the wheel 50. Tapered ends of the two parallel bars 73 abut the tapered ends of the dips 74 urged together by their respective springs 76. Pushing on the release pin 72 causes the tapered ends of the bars 73 to slide the dips apart and away from each other allowing the release of the connector 40 as described below. Releasing of the second button 70 allows the dips 74 to move closer together and towards each other, as urged by the springs 76, as well as moving the release pin 72 back into the initial position.

Figure 15:
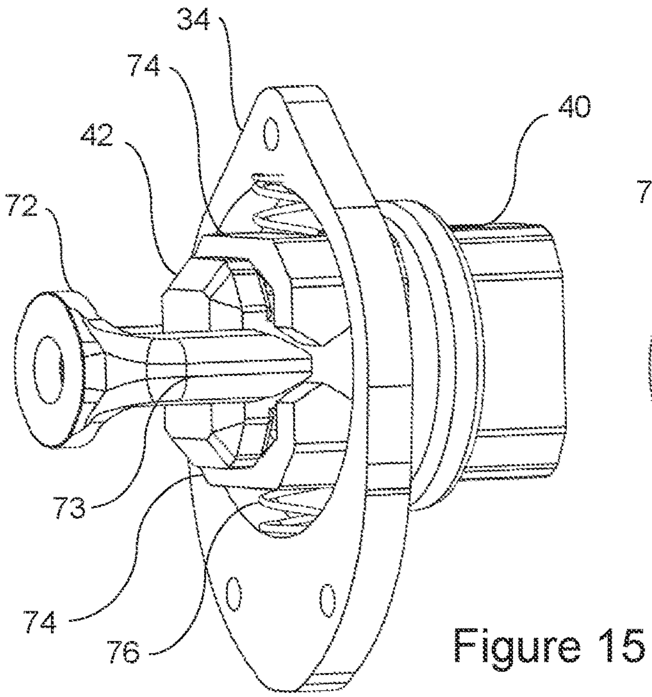
FIG. 15 is an alternative perspective view of the connector 40 engaged with the pair of spring-loaded dips 74, also showing the release pin 72.
Figure 16:
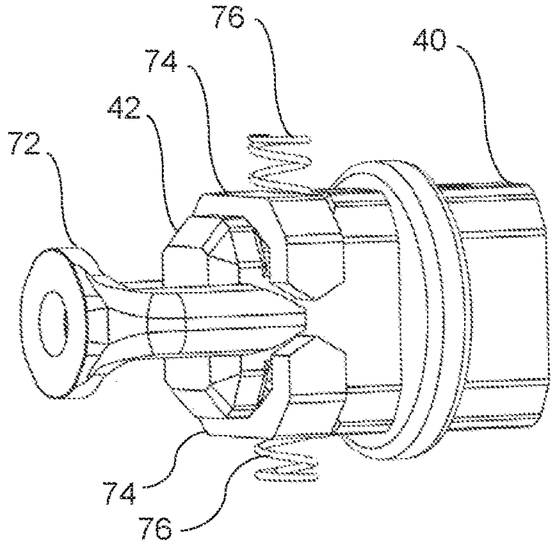
FIG. 16 is the same as in FIG. 15 but with the cover plate 34 removed.
Figure 17:
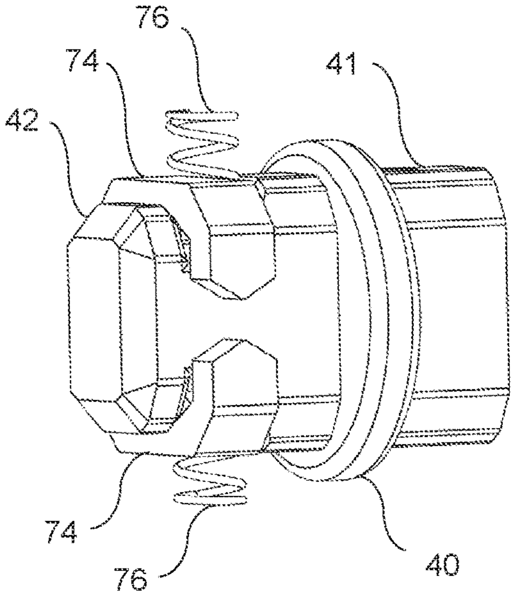
FIG. 17 is the same as in FIG. 16 but with the release pin 72 removed.
Figure 18:
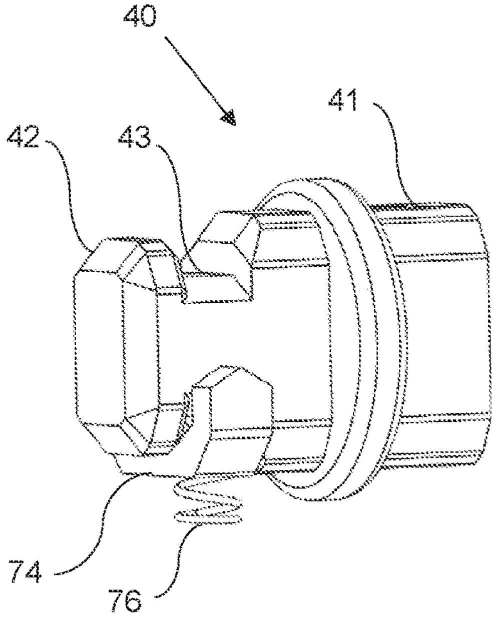
FIG. 18 is the same as in FIG. 17 but with one clip 74 and one spring 76 removed.

Another view of that subassembly is seen in FIGS. 15-18, showing different stages of its disassembly. Initial position in FIG. 15 shows the release pin adjacent to the pair of dips 74, which in turn reside over the neck 43 behind the tapered portion 42. Engagement of the dips 74 and the connector 40 assures retention of the tool tip 10 inside the tool head assembly 30. FIG. 16 shows the same but without the cover plate 34. The tapered portion 42 is located partially inside the opening between two bars 73 of the release pin 72. Tapered surfaces on both the bars 73 and the dips 74 may be configured to assure separation of the dips 74 by moving them apart from each other upon insertion of the bars 73 in between the ends of the dips 74. The depth of movement of the bars 73 may be selected to assure sufficient separation of the dips 74 to allow removal of the tapered portion 42 of the connector 40 from the toothed wheel 50 leading to an ability to replace one tool tip with another. FIGS. 17 and 18 show the details of the engagement of the dips 74 over the neck 43 of the connector 40.

Figure 19:
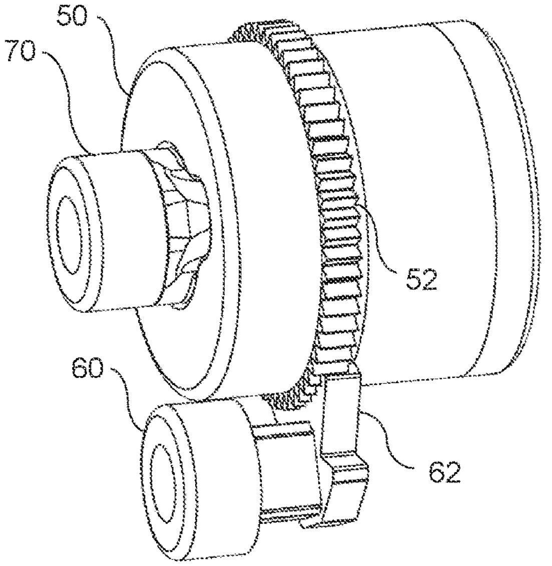
FIG. 19 is an alternative perspective view of the toothed wheel 50 and the teethed lever 62 subassembly.
Figure 20:
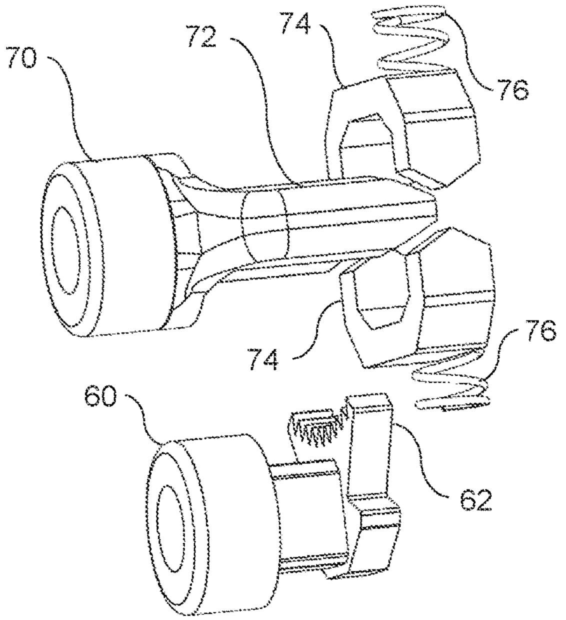
FIG. 20 is the same but with the toothed wheel 50 removed.
Figure 21:
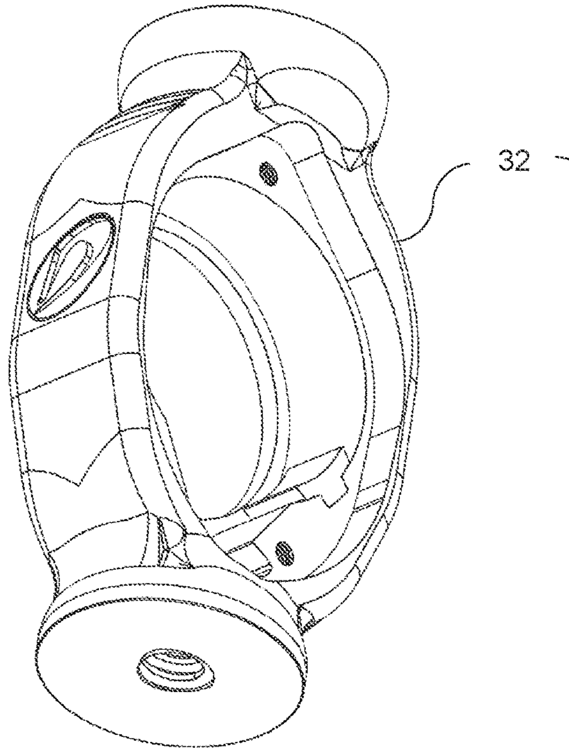
FIG. 21 is a perspective side view of the tool head housing.
Figure 22:
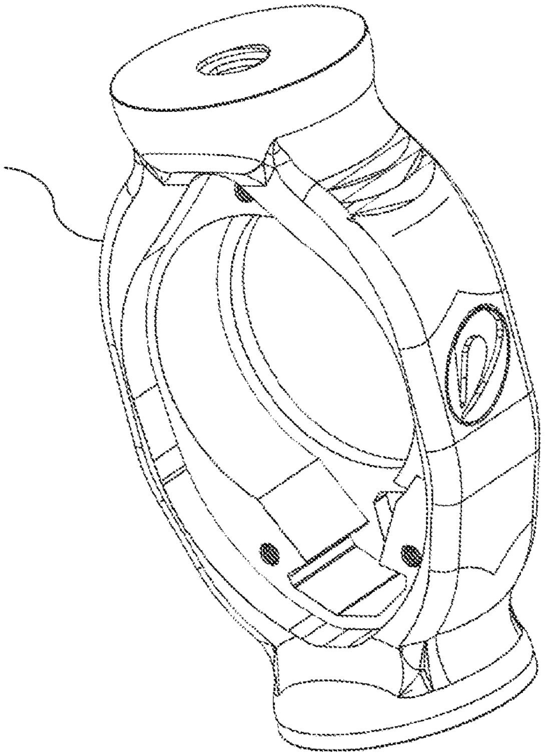
FIG. 22 is an alternative side view of the same.

FIG. 19 and FIG. 20 show alternative views of the toothed wheel 50 engaged with the teethed lever 62 and the button 60. Also seen in FIG. 19 the button 70 and a portion of the release pin 72 attached thereto. FIG. 19 demonstrates the sliding arrangement of the release pin 72 inside the corresponding grooves in the toothed wheel 50. FIG. 20 shows an alternative view of the release pin 72 position next to the pair of clips 74.

The use of the device is now described in greater detail. Initially, the connector 40 is not present and the clips 74 are located in close proximity to each other inside the void formed in the toothed wheel 50. The teethed lever 62 is engaged with the teeth 52 of the wheel 50 thereby fixing its position inside the housing 32.

The user takes the desired tool tip 10 and inserts the tapered end 42 into the opening in the toothed wheel 50. The taper of the tapered end 42 causes the clips 74 to spread apart. Once the tapered end passed under the clips 74, springs 76 push the clips 74 closer together as they protrude inside the neck 43 of the connector 40. This motion causes engagement of the connector 40 with the tool head assembly 30 in a fixed position so that the user may use the handle to manipulate the end of the tool as required for the dent removal repair.

If an exchange of one tool tip for another is needed, the user presses the second button 70. That in turn causes the release pin 72 to move deeper inside the internal opening of the toothed wheel 50. Bars 73 engage with the clips 74 and cause their lateral movement apart from each other. This releases the tapered end 42 and the user may remove the tool tip 10 from the handle assembly 100, followed by insertion of another tool tip 10 using reverse series of steps.

If a repositioning or rotation of the handle is needed without a need to change the tool tip 10, the user presses on the first spring-loaded button 60, which causes disengagement of the teethed lever 62 from the plurality of teeth 52 of the toothed wheel 50. Once the lever 62 is disengaged, the toothed wheel 50 is free to rotate in any direction so that the user may reposition the handle of the tool in any way that is convenient. Release of the button 60 causes the teethed lever 62 to move back into a position of engagement with the teeth 52 of the wheel 50, thereby securely and fixedly retaining the dent removal tip to facilitate direct transmission of force and torque from the handle assembly 100 to the dent removal tip 10 during dent removal operations.

All components of the novel device may be made from metal or from other suitable materials. Handle portions 20, for example, may be made from a suitable polymer to reduce the overall weight of the tool.

The above-described first embodiment provides for the main use of the invention, namely the novel handle. It does have one limitation for the owners of existing commercially-available tips 10, in that each tip 10 has to be fitted with a corresponding bushing 13 to transition to the connector 40. For each tip 10, the owner of the tip would have to buy and permanently attach a corresponding bushing 13 with the dedicated connector 40.

The second and the third embodiments of the invention address this limitation by providing a quick-connect coupling 213 and 313 configured to work with the most popular commercially available tips 10. Using the quick-connect coupling allows the tool owner to attach the coupling to the handle once and then rapidly replace tips 10 during the repair process.

FIGS. 27-34 illustrate the second embodiment of the invention, in which the bushing 13 is replaced with a quick-connect coupling 213. This embodiment is designed to work with the KIPP system of tools and tips 10, which all have the same KIPP attachment 11 characterized by socket having a toothed circular end 12 and a grove 14 located on the tool side of the circular end 12.

Figure 28:
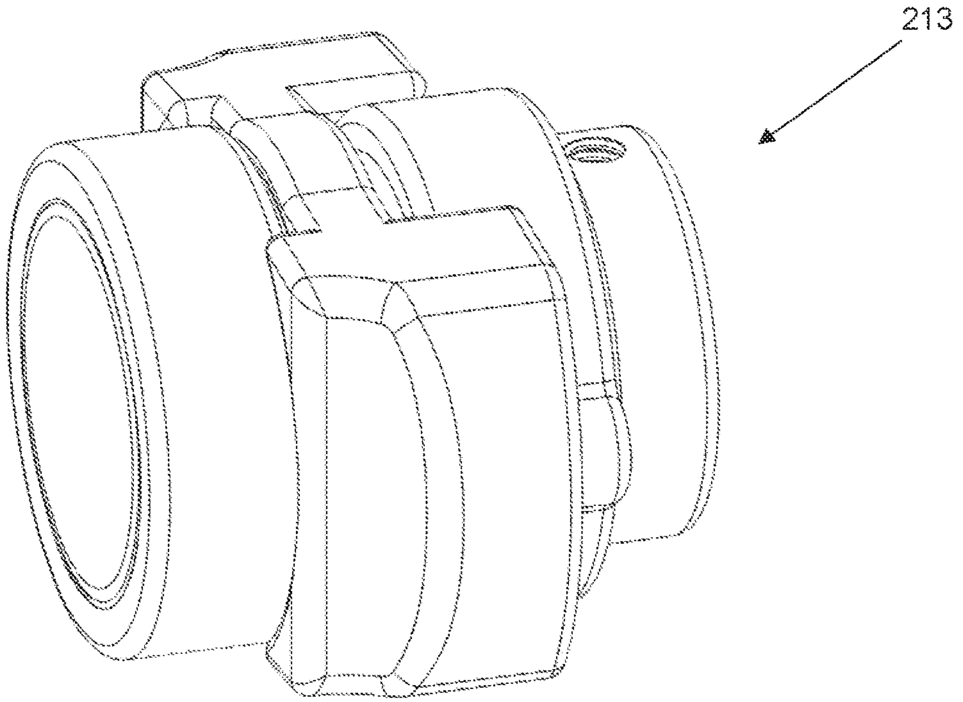
FIG. 28 is a perspective view of the quick-connect coupling.
Figure 29:
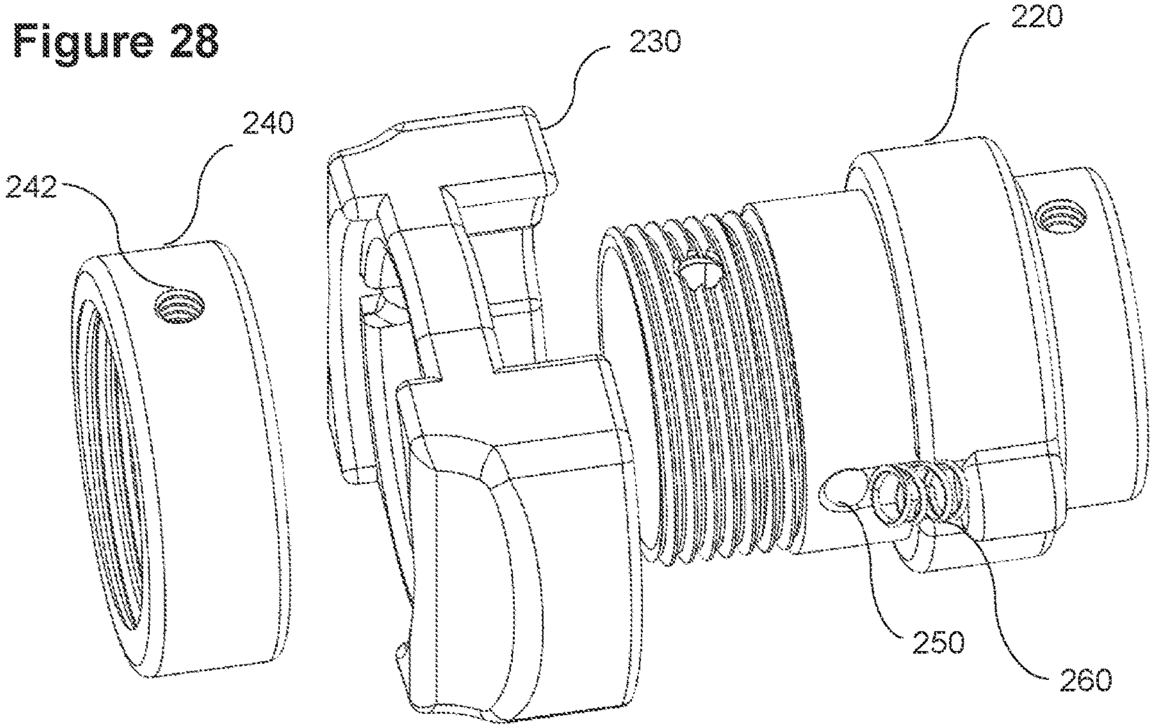
FIG. 29 is a perspective exploded view of the same.
Figure 30:
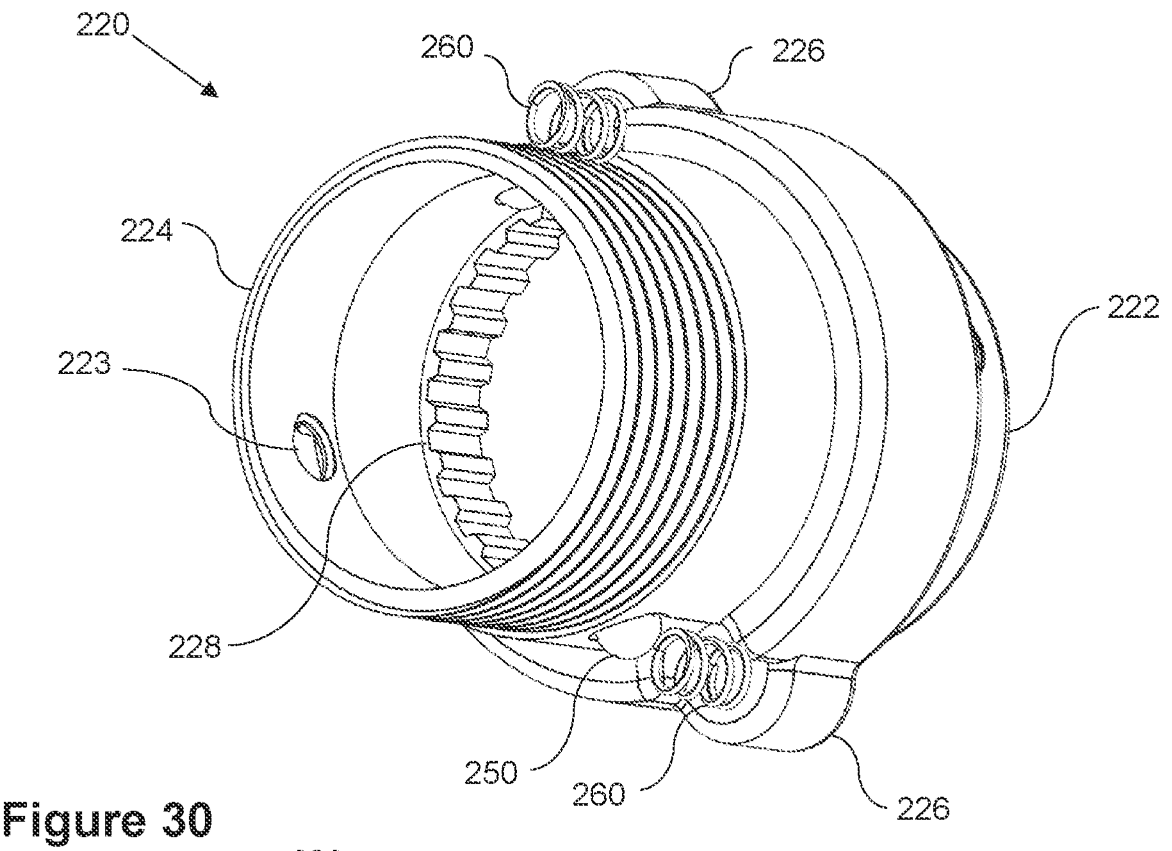
FIG. 30 is a perspective side view of the quick-connect body of the same.

FIG. 28 shows the quick-connect coupling 213 assembly in greater detail, while FIG. 29 shows an exploded view thereof illustrating three main components: a cap 240, a spring-loaded slider 230, and the quick-connect body 220. Also seen in FIG. 29 are spring 260 and a fixating ball 250, described in greater detail below.

The quick-connect body 220, in turn, features a handle side 222 and a tool side 224 on the opposite side of the quick-connect body 220. The handle side 222 has one, two, or more spring seats 226 (two are illustrated in these figures) protruding outwards from the body 220 and configured to each have a cavity in which one end of the spring 260 may be placed. A plurality of spring seats 226 may be symmetrically located around the periphery of the quick-connect body 220 as the invention is not limited in this regard. Alternatively, other spring arrangements may be used, such as a singular circular spring positioned between the slider 230 and the handle side 222.

The tool side 224 of the quick-connect body 220 may be threaded and sized to accept the internally threaded cap 240 outside thereof. The internal diameter of the tool side 224 may be selected to accept inside the circular end 12 of the tip 10. A toothed opening 228 may be positioned in the middle portion of the quick-connect body 220, as better seen in FIGS. 30 and 31. The toothed portion 228 may be sized to mate with the corresponding socket having a toothed circular end 12 of the KIPP tool tip 10.

Figure 31:
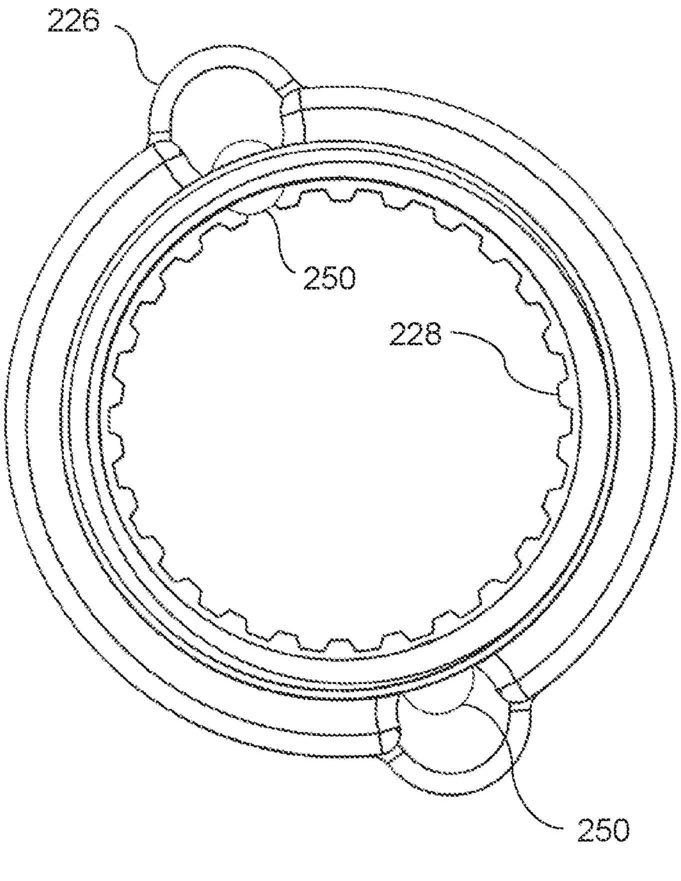
FIG. 31 is a front view of the quick-connect body.
Figure 32:
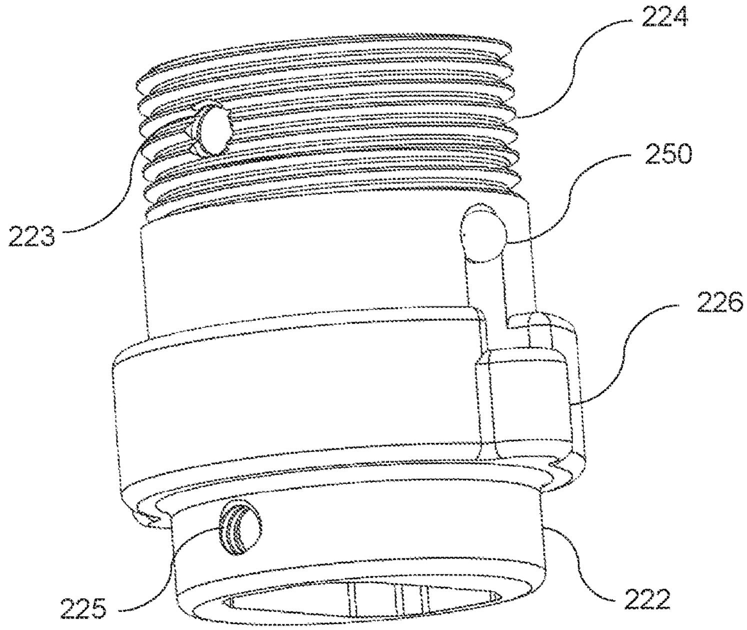
FIG. 32 is another perspective side view of the quick-connect body.

One, two, or more fixating balls 250 may be positioned about the periphery of the quick-connect body 220. FIG. 31 shows two symmetrical balls 250, but the invention is not limited in this regard. The purpose of the fixating balls 250 is to keep the tip 10 inside the quick-connect coupling 213 when the slider 230 is released and is urged by the springs 260 to move to the position away from the handles 20, as described in greater detail below. The size of the fixating balls 250 may be selected to be suitable to move into corresponding openings in the quick-connect body 220 but not fall through on the internal side. The depth of the openings may be selected to support the balls 250 in either the most inward fixating position or in the most outward release position when the slider 230 is moved out of the way to allow the fixating balls 250 to move outwards.

Figure 33:
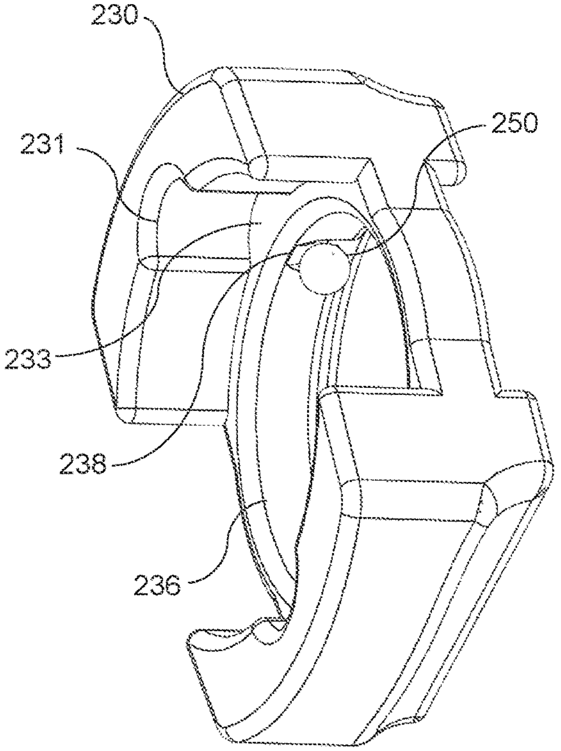
FIG. 33 is a first perspective view of the quick-connect slider.
Figure 34:
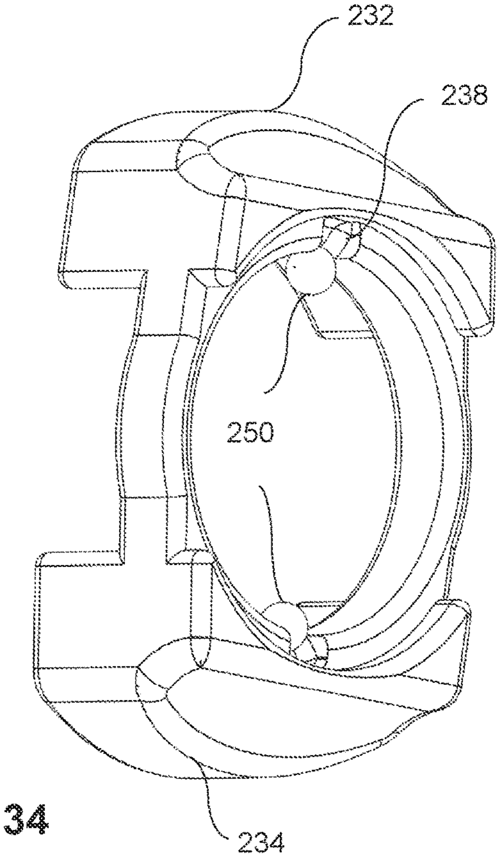
FIG. 34 is a second perspective view of the same.
Figure 35:
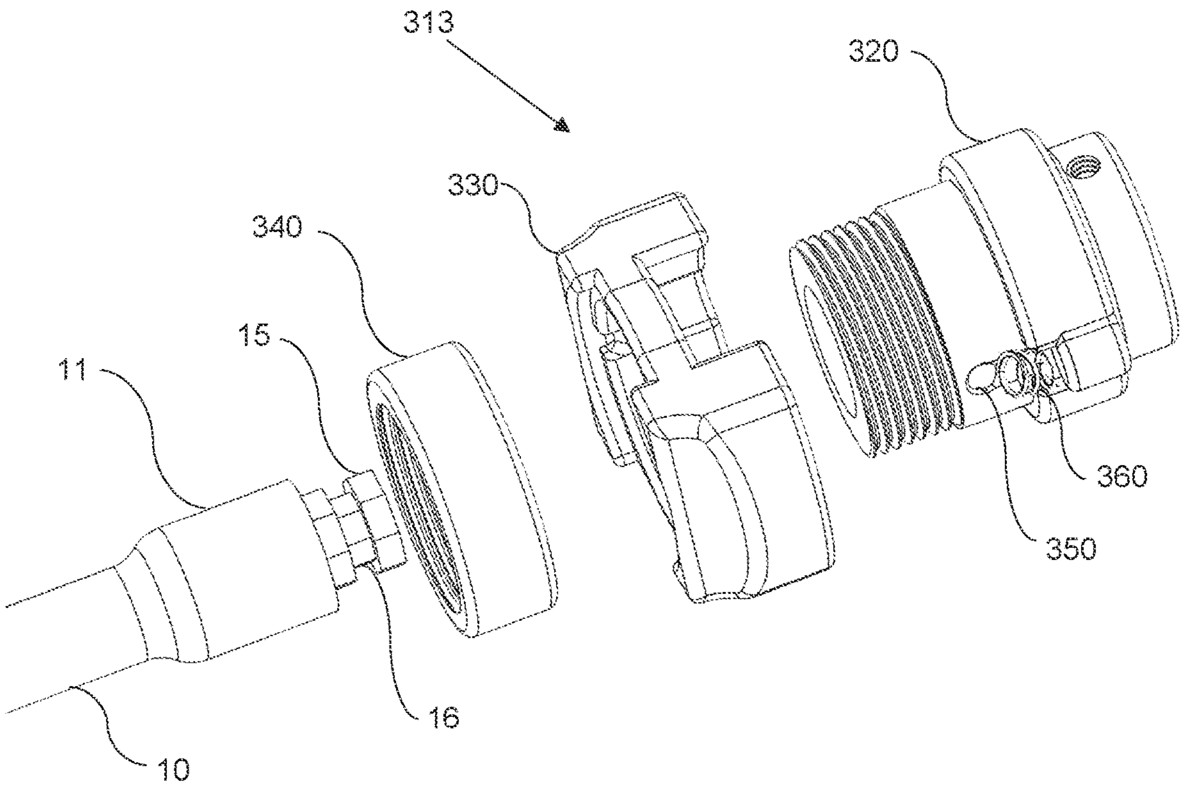
FIG. 35 is a perspective exploded view of the third embodiment of the present invention.

The spring-loaded slider 230 in combination with the two fixating balls 250 are seen in greater detail in FIGS. 33 and 34. The slider 230 may feature two slider handles 232 and 234 located opposite each other and shaped to facilitate the moving of the slider 230 along the central axis of the quick-connect coupling 213 between the locked position and the release position. The slider 230 features a central circular opening 236 sized to allow positioning of the slider 230 over the tool side 224 of the quick-connect body 220. A well 231 with an end-wall 233 is seen on two sides of the slider 230, which is positioned along the location of each spring 260. Therefore, each spring 260 is placed on one end into the spring seat 226 and on the other end into the well 231.

Each fixating ball 250 is placed inside a tapered groove 238 having an inclination angle oriented away from the tool side 224. Each groove 238 is shaped to urge the fixating ball into the corresponding opening in the quick-connect body 220 when the slider 230 is released—so as to lock the tool tip 10 in place inside the quick-connect coupling 213. At the same time, each groove 238 is also shaped to release the fixating ball and have sufficient space for the fixating ball 250 to move out of the groove 14 of the tool tip 10 when the slider 230 is moved towards the handles 20 and when the springs 260 are compressed.

The cap 240 is designed to retain the slider 230 over the quick-connect body 220. It has a threaded inner diameter and a threaded opening 242 for a set screw, which may extend into the corresponding opening 223 of the body 220 so as to retain the cap 240 in place.

The entire design of the quick-connect coupling 213 is made with smooth corners and no sharp edges so as to improve the safety of operation and avoid slips and cuts that may be caused during the forceful application of the paintless dent removal procedures.

In use, the quick-connect coupling 213 is first assembled with the connector 40 by inserting the first end 41 thereof into the corresponding opening of the handle side 222 and fixating it therein by a set screw placed into the threaded hole 225 of the handle side 222. The second end of the connector 40 is then inserted into the tool head assembly 30. Pushing on both slider handles 232 and 234 in a direction towards the tool head assembly 30 causes the springs 260 to compress, allowing the slider 230 to move to the release position, thereby allowing the fixating balls 250 to move outwards. A socket of the tool tip 10 is then inserted into the tool side 224 of the quick-connect body 220 until the toothed circular end 12 mates with the corresponding opening 228. Releasing the slider 230 causes the springs 260 to urge the slider 230 to move in the direction towards the tip 10, which causes the tapered grooves 238 to push on the fixating balls 250 and move them towards the center of the quick-connect body 220. At this point, the fixating balls 250 are located within the space defined by the groove 14 of the tool tip 10, thereby fixating the position of the tool tip 10 inside the quick-coupling 213 and the head assembly 30. The use of the entire combination of the head assembly 30, quick-connect coupling 213, and the tip 10 may now begin for the purposes of dent removal repair.

Once the tip 10 needs to be changed to another tip 10 with the same KIPP attachment, it can be accomplished by pulling the slider 230 again towards the tool head assembly 30, thereby allowing the fixating balls 250 to move outwards and releasing the previous tool from the quick-connect coupling 213. Positioning the next tool tip 10 inside the coupling 213 and releasing the handles 232 and 234 accomplishes firm fixation of the next tool tip in the tool head assembly, which facilitates the continuation of the repair process.

The design of the quick-connect coupling is advantageous in that it is symmetrical and provides for a longitudinal alignment of the dent removal tip with a center of the housing, thereby balancing the handles to be equally positioned on both sides of the dent removal tip, which makes the use of the handles 20 intuitive and natural.

Figure 36:
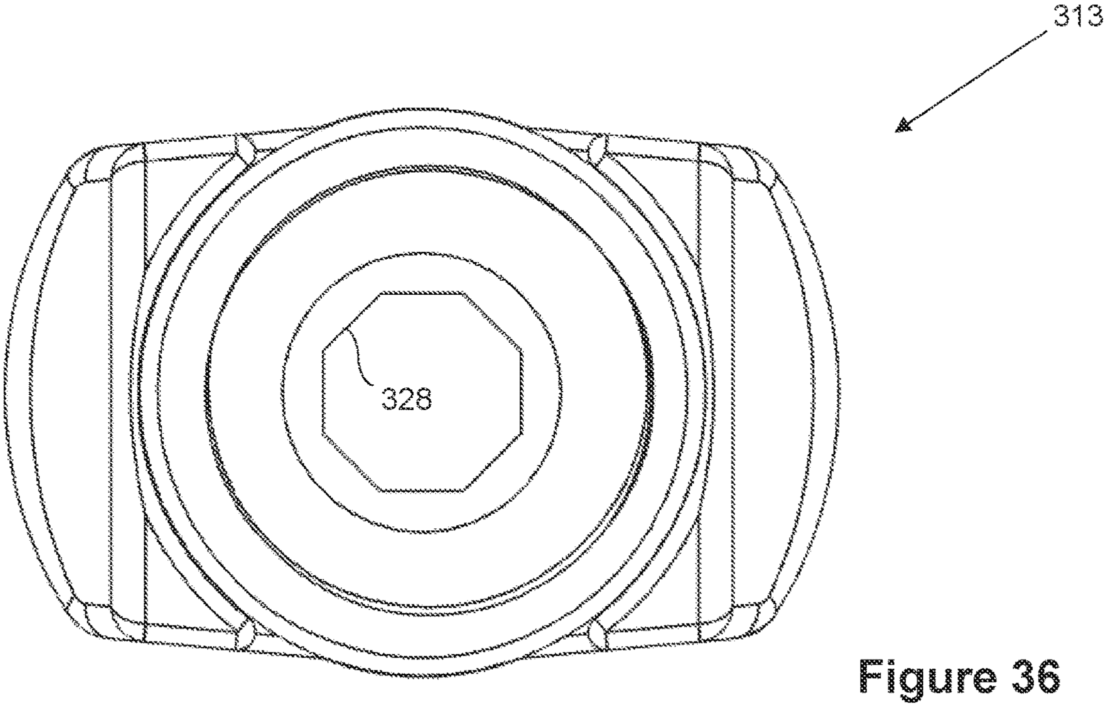
FIG. 36 is a front view of the quick-connect coupling of the third embodiment.
Figure 37:
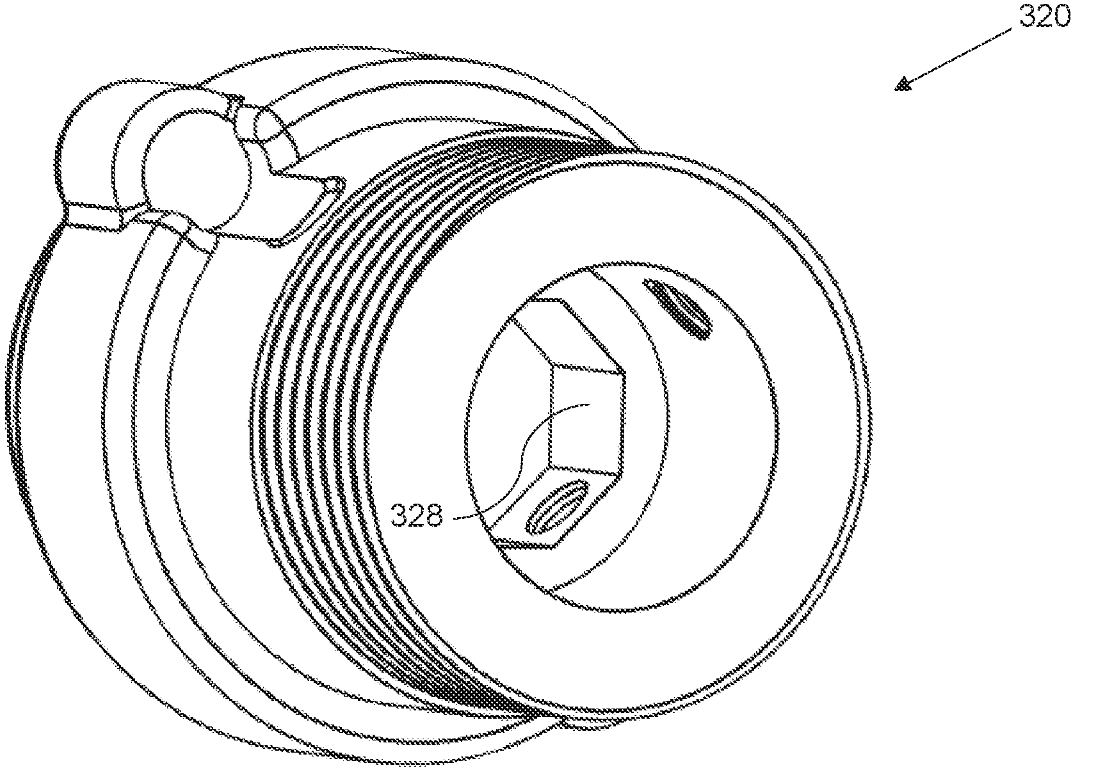
FIG. 37 is a perspective view of the quick-connect body of the third embodiment.

A third embodiment of the invention is illustrated in FIGS. 36-37. It is a design similar to that of the second embodiment and includes a quick-connect coupling 313, which includes a ring 340, a spring-loaded slider 330, a quick-connect body 320, a pair of fixating balls 350, and a corresponding pair of springs 360. The difference between the third embodiment and the second embodiment is that the third embodiment is configured to work with another commercially-available set of tools for paintless dent removal, namely ULTRA. The ULTRA socket system of tools has the same convention for the ends of their tool sockets, namely an octagon end 15 with an octagon groove 16 adjacent thereto. The concept of a quick-release of these tips is the same, namely the use of two fixating balls 350 that can move between the inner locked position when urged by the slider 330 and the outward unlocked position when the slider 330 is moved out of the way.

FIG. 36 shows a front view of the quick-connect coupling 313 of the third embodiment, while FIG. 37 shows a perspective view of the quick-connect body 320. The octagon-shaped opening 328 in the body 320 is made to correspond to the shape of the ULTRA tools. The rest of the components and the method of using the coupling 313 are the same as for the second embodiment of the invention.

Further configurations of the quick-connect coupling are also envisioned and may be shaped to match the shape of other commercially-available tools in this field. Using the quick-connect coupling that is attached to the tool head assembly 30 makes the entire tool kit contain two quick-connect devices so as to make it convenient to use a broad variety of tools designed for paintless dent removal.

The tool kit, in this case, may comprise the tool head assembly 30 with the handles 20 put together with at least one or more quick-connect couplings to make the tool compatible with the tips 10 available commercially elsewhere.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A paintless dent repair tool kit comprising:

a housing with at least one handle extending therefrom, the housing containing a toothed wheel rotatably retained therein, the toothed wheel having a plurality of teeth extending outwards therefrom, the toothed wheel is configured to receive, replace, and removably retain a second end of a connector inside thereof, the housing further comprising a first button connected to a teethed lever slidably positioned to be either engaged or disengaged with the plurality of teeth of the toothed wheel depending on a position of the first button, the housing is further comprising a second button attached to a release pin slidably positioned inside the toothed wheel and configured to cause release of the second end of the connector upon pressing the second button, wherein unless the first button and the second button are depressed, the connector is configured to be securely and fixedly retained within the housing to facilitate direct transmission of force and torque from the at least one handle to the connector during dent removal operations, at least one quick-connect coupling with a quick-connect body shaped to be attached to a first end of the connector, the quick-connect coupling comprising a spring-loaded slider movable between a locked position and a released position, and a plurality of dent removal tips, each tip having one end equipped with a socket configured for removable attachment to the quick-connect coupling, wherein when the slider is moved to the release position, the socket of the dent removal tip is released from the quick-connect coupling, and when the slider is released, the socket of the dent removal tip is securely retained within the quick-connect coupling, thereby facilitating direct transmission of force and torque from the at least one handle to the dent removal tip during dent removal operations.

2. The paintless dent repair tool kit as in claim 1, wherein the quick-connect coupling is configured for retaining the dent removal tip having a socket having a toothed circular end and a groove located on a tool side of the toothed circular end.

3. The paintless dent repair tool kit as in claim 1, wherein the quick-connect coupling is configured for retaining the dent removal tip having an socket with an octagon end with an octagon groove adjacent thereto.

4. The paintless dent repair tool kit as in claim 1 comprising two or more quick-connect couplings, each quick-connect coupling is configured for use with a socket of a commercially-available set of dent removal tips.

5. The paintless dent repair tool kit as in claim 1, wherein the housing has two handles extending therefrom; and wherein the quick-connect coupling is symmetrical and provides for a longitudinal alignment of the dent removal tip with a center of the housing, thereby balancing the handles to be equally positioned on both sides of the dent removal tip.

6. The paintless dent repair tool kit as in claim 1, wherein the quick-connect coupling has a tool side and a handle side opposite the tool side, the tool side has a threaded outer diameter configured to accept a correspondingly threaded cap, the cap having an internal diameter sized to accept the socket of the dent removal tip therethrough.

7. The paintless dent repair tool kit as in claim 6, wherein the slider has a pair of handles located opposite each other.

* * * * *